July 1, 1947.  J. W. ASHLEY  2,423,136
HEEL SEAT FITTING MACHINE
Filed Nov. 23, 1945  12 Sheets-Sheet 1

Inventor
John W. Ashley
By his Attorney

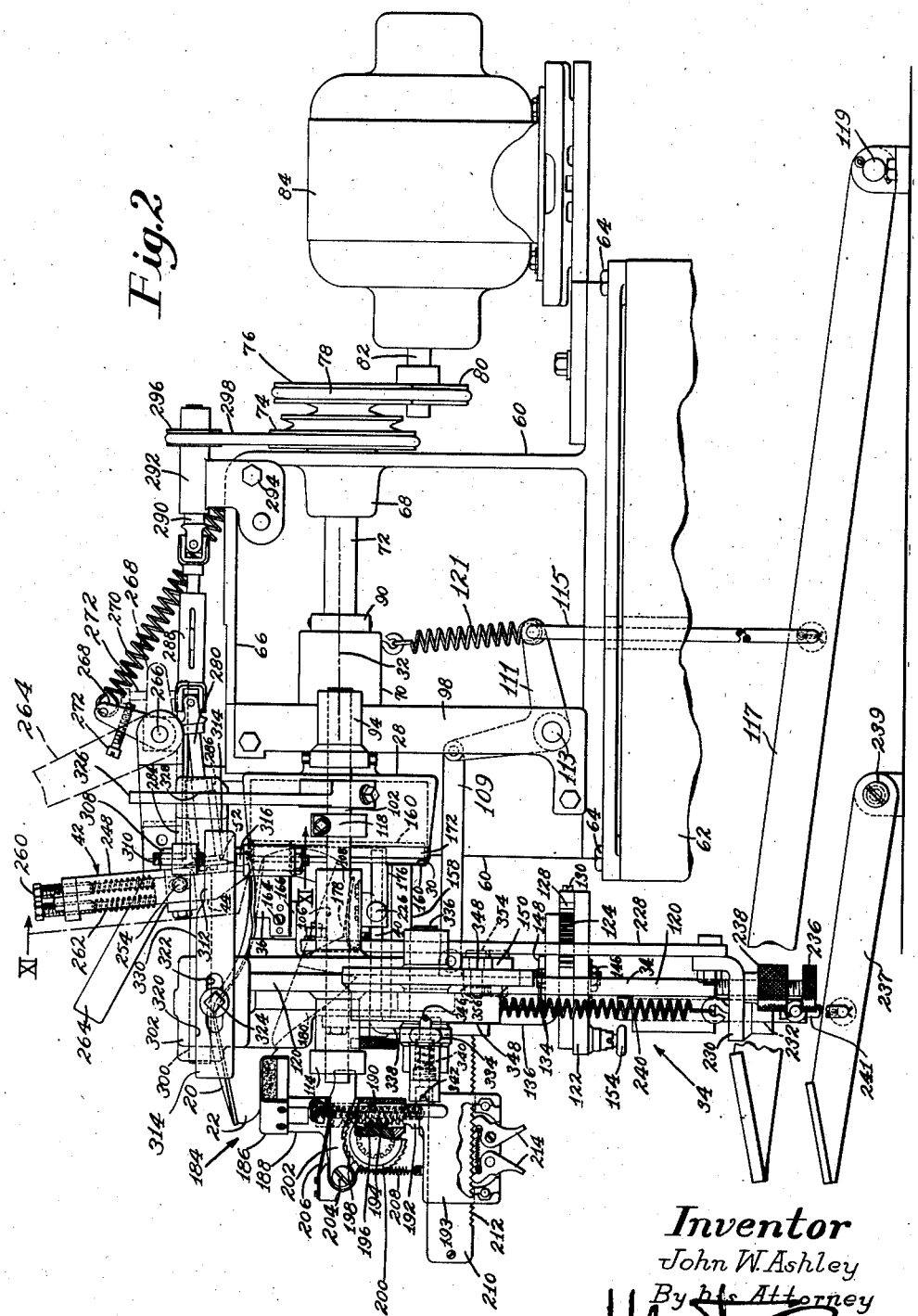

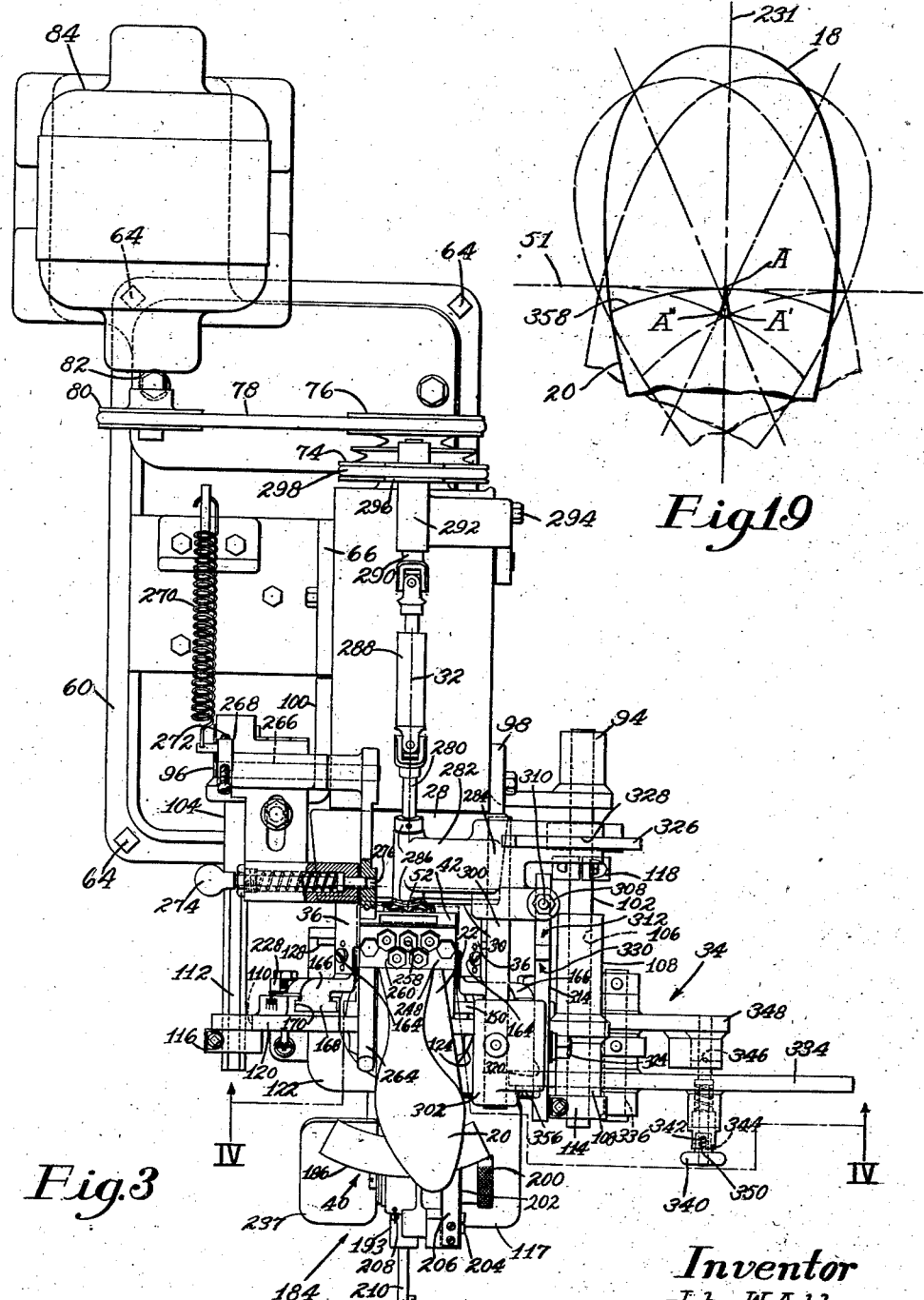

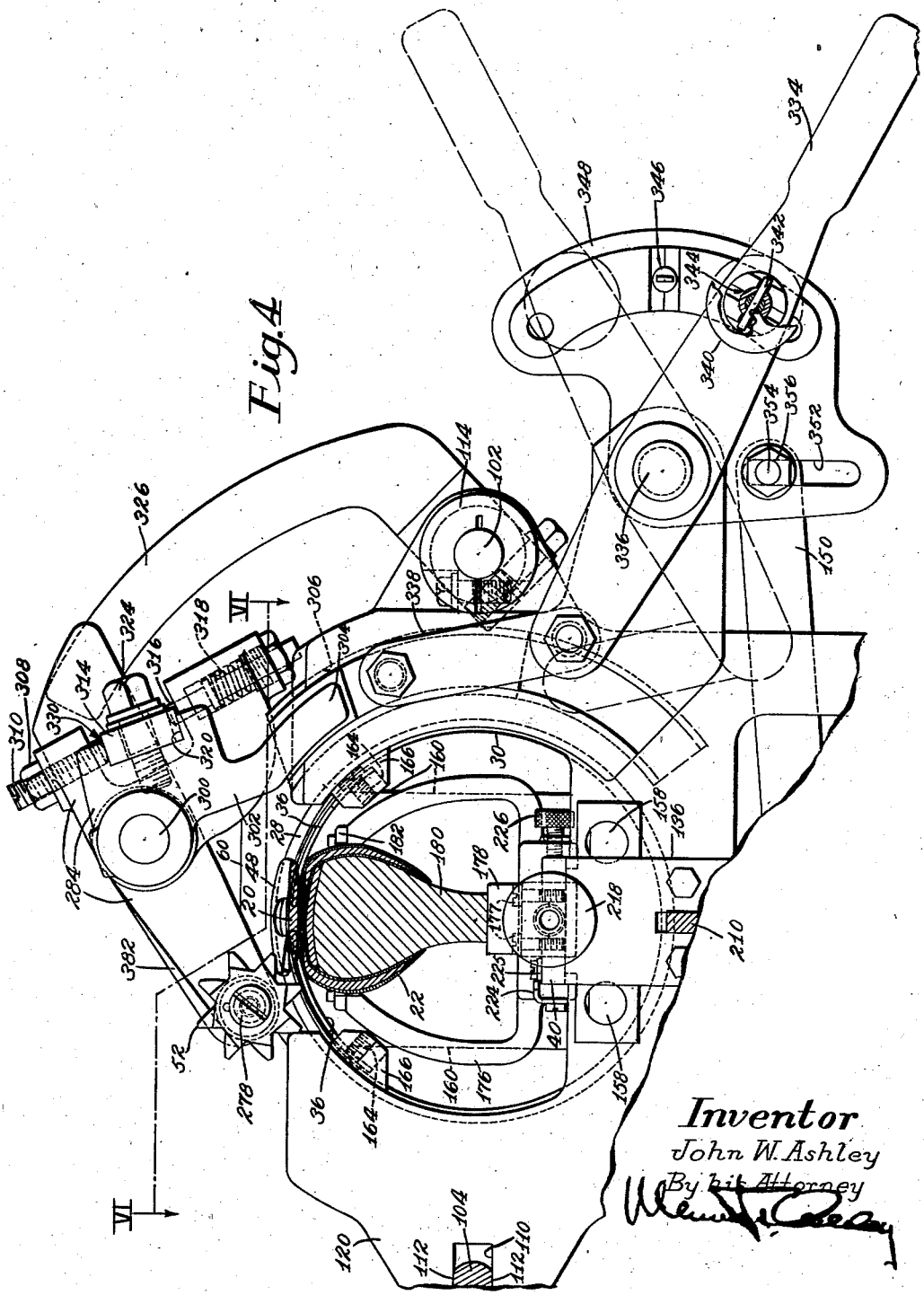

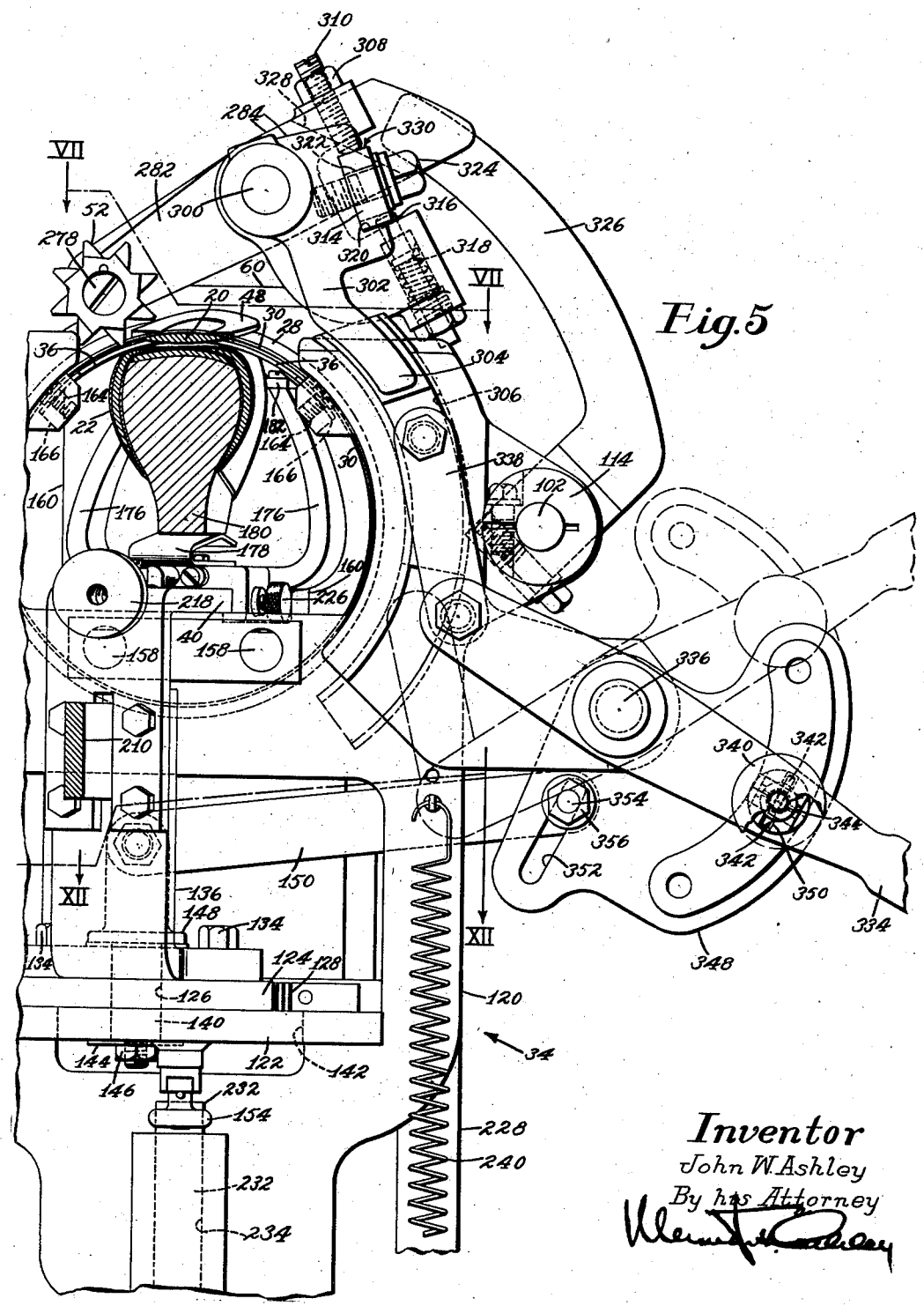

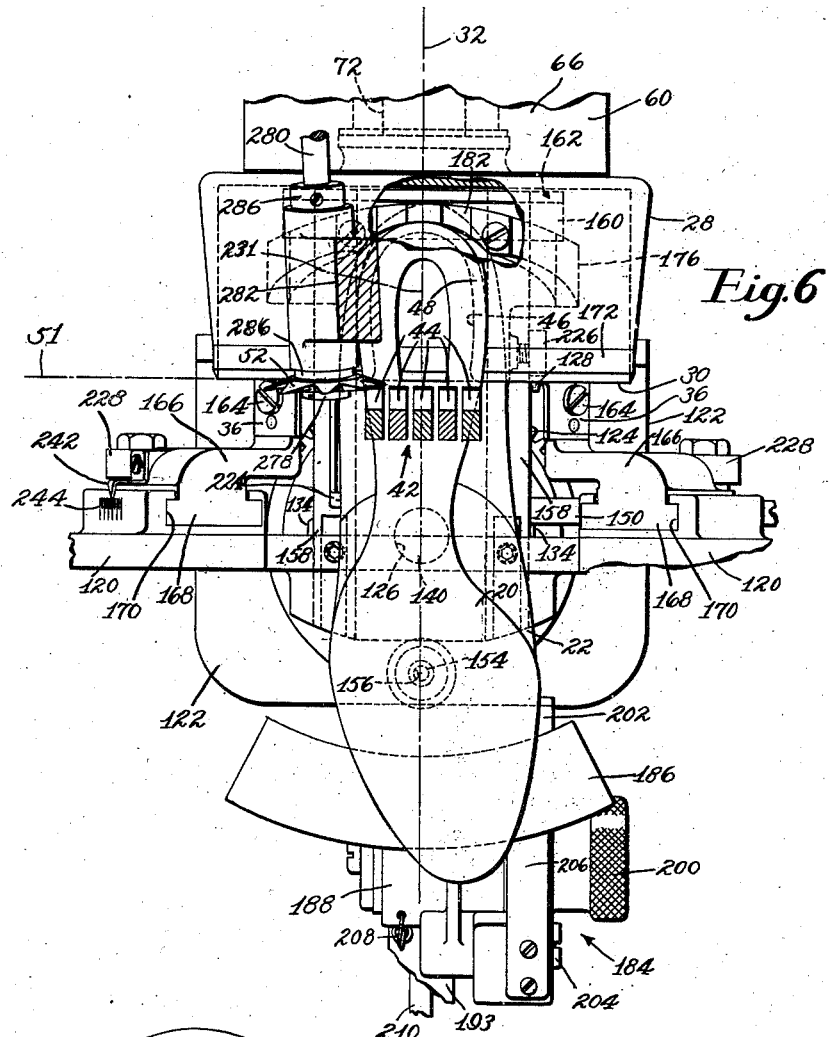
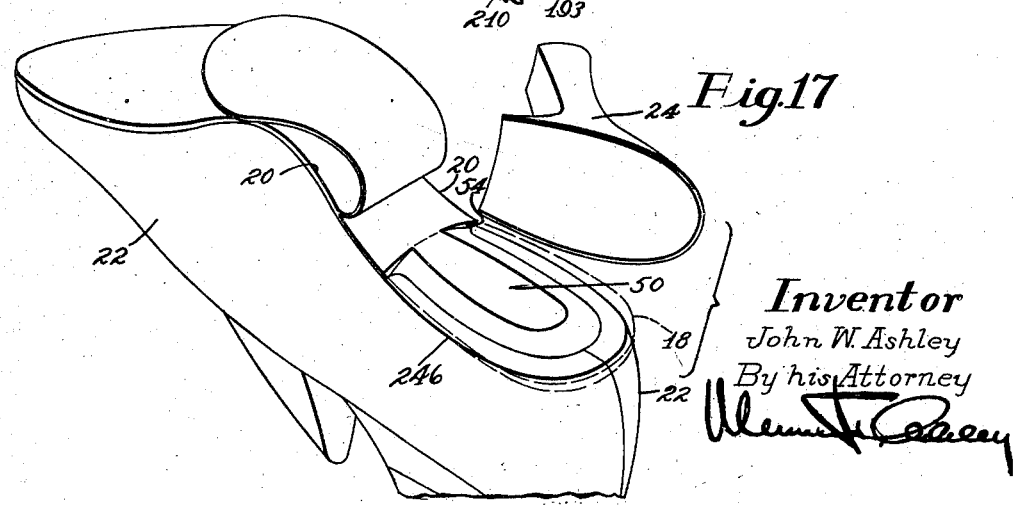

Inventor
John W. Ashley
By his Attorney

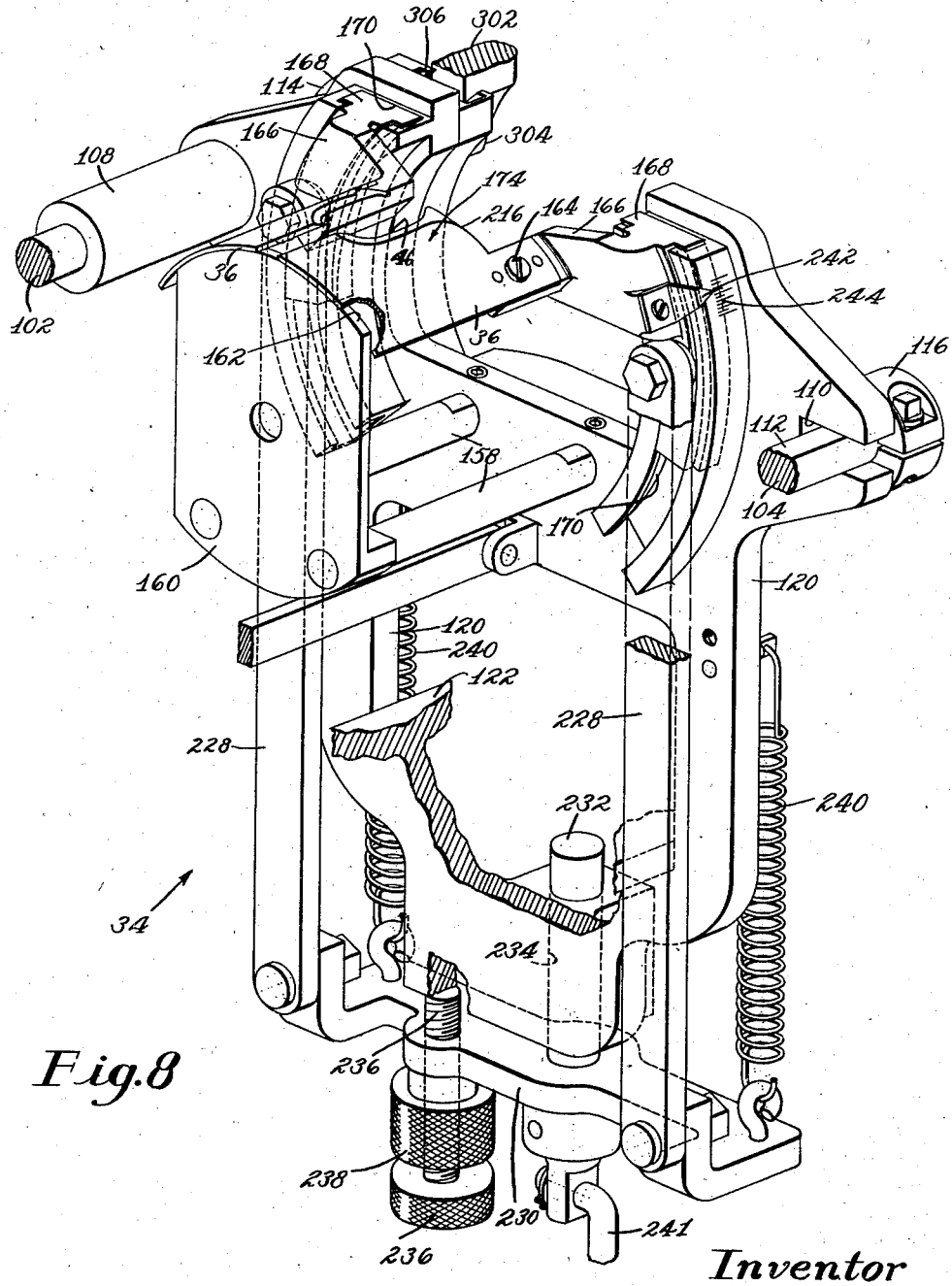

Inventor
John W. Ashley
By his Attorney

July 1, 1947.  J. W. ASHLEY  2,423,136
HEEL SEAT FITTING MACHINE
Filed Nov. 23, 1945   12 Sheets-Sheet 10

Inventor
John W. Ashley
By his Attorney

July 1, 1947.  J. W. ASHLEY  2,423,136
HEEL SEAT FITTING MACHINE
Filed Nov. 23, 1945  12 Sheets-Sheet 11
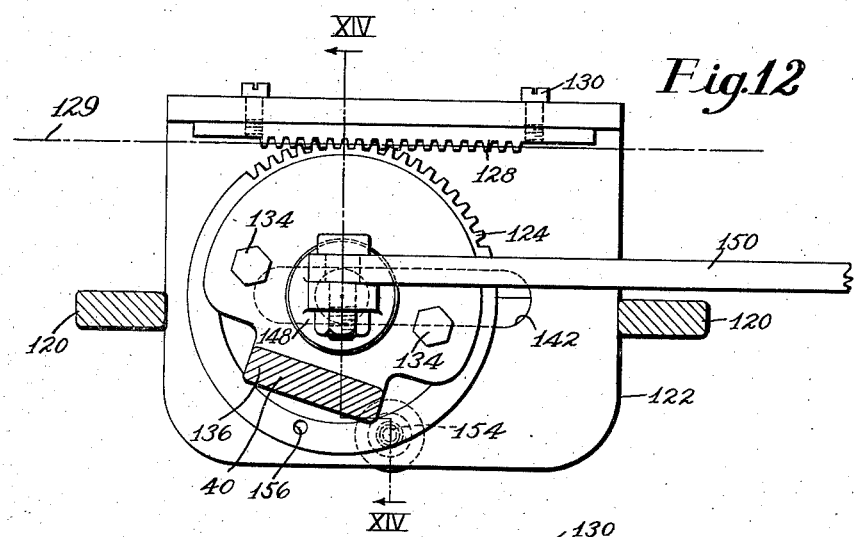
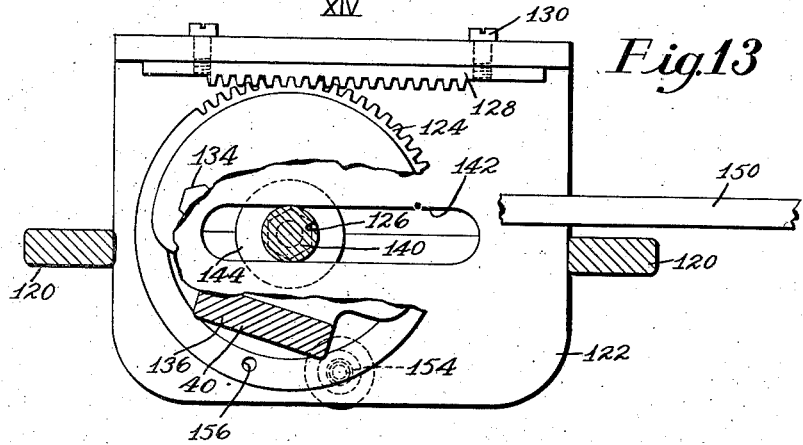
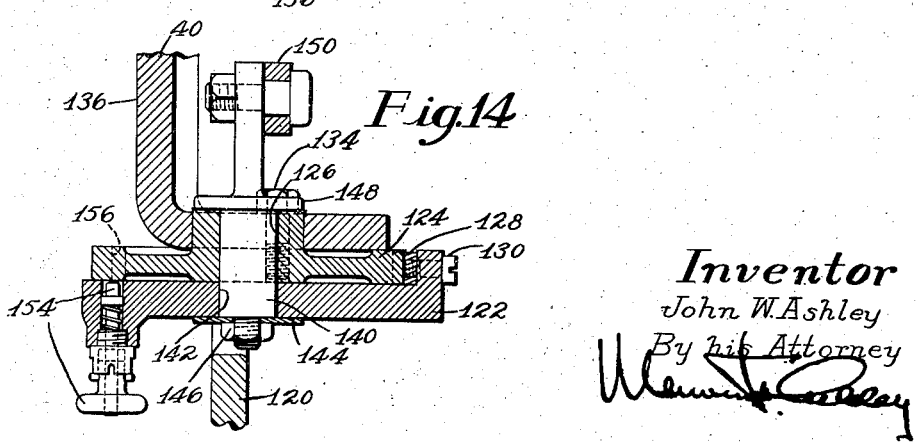
Inventor
John W. Ashley
By his Attorney

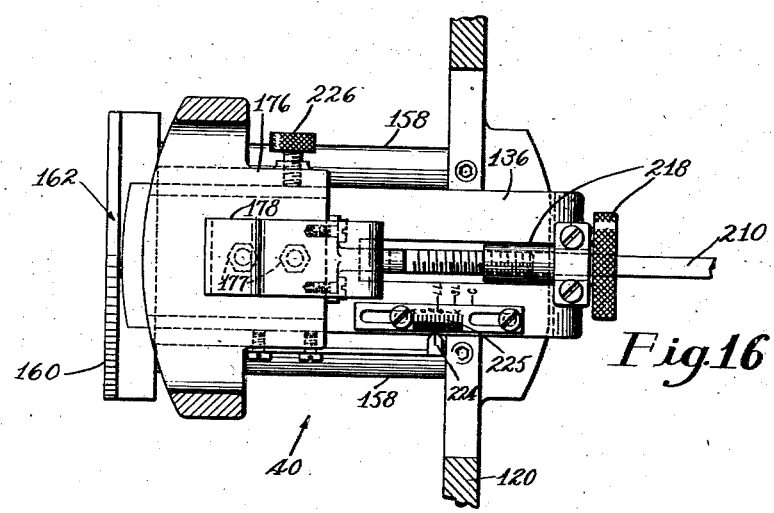
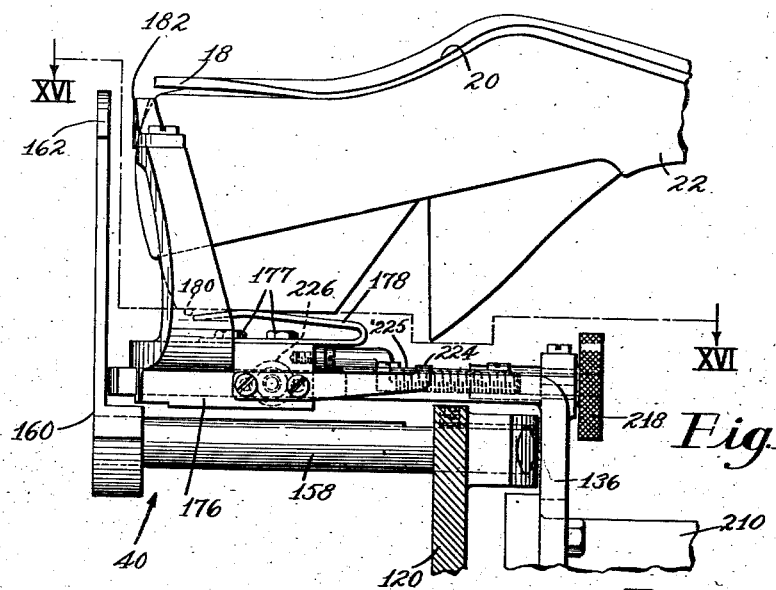

Patented July 1, 1947

2,423,136

UNITED STATES PATENT OFFICE 2,423,136

HEEL SEAT FITTING MACHINE

John W. Ashley, Beverly, Mass., assignor to United Shoe Machinery Corporation, Flemington, N. J., a corporation of New Jersey Application November 23, 1945, Serial No. 630,259

44 Claims. (Cl. 12—31.5)

1

This invention relates to machines for preparing the heel-seat portions of outsoles of women's shoes for the reception of heels.

It is an object of the present invention to provide an improved heel seat fitting machine of the general type disclosed in United States Letters Patent No. 1,805,039, granted May 12, 1931, on an application filed in the name of Sidney J. Finn. With the above object in view and in accordance with a feature of this invention, there are provided, in a heel seat fitting machine, a tubular cutter, a support for a shoe, a matrix constructed and arranged to be engaged by the heel-seat portion of an attached outsole of the shoe, a presser member for forcing the heel-seat portion of said outsole against the matrix, and means for effecting relative movement of translation between the cutter on the one hand and the support and the matrix on the other hand to cause the heel-seat portion of the outsole flexed progressively between the presser member and the matrix to be reduced.

In order to form heel breast receiving shoulders on the outsole and to remove from said outsole a horseshoe-shaped chip of surplus material trimmed during the heel seat reducing operation from the margin of the heel-seat portion of the outsole by the tubular cutter, there is provided, in accordance with another feature of this invention, a power-driven cutter which is movable transversely of the outsole of the shoe held stationary upon the shoe support along a curved cutting edge of the tubular cutter for forming upon the outsole heel breast receiving shoulders suitably shaped for the reception of Louis heels. In accordance with a further feature of the present invention, the shoe support of the illustrative machine is mounted for swinging movement in timed relation to the movement of the shoulder forming cutter, the construction and arrangement being such that the heel-seat portion of the outsole of the shoe mounted upon the support is swung laterally in the general plane of its break line as the shoulder forming cutter is moved transversely of the outsole, thereby removing from the outsole material trimmed from the heel-seat portion of the outsole by the tubular cutter, to form on said outsole heel breast receiving shoulders shaped and arranged to receive a Cuban heel.

The illustrative matrix upon which the heel-seat portion of the outsole is supported comprises, in accordance with another feature of the invention, a pair of plates outcurved work supporting faces of which are positioned adjacent to, and in approximately concentric relation with, the circular cutting edge of the tubular cutter, said

2 plates forming between them a U-shaped opening into which the central part of the heel-seat portion of the outsole is forced by the presser member during the heel seat reducing operation. In order to vary the size of the heel seat tab formed upon the fitted heel-seat portion of the outsole in accordance with the size of the shoe, said matrix plates are initially adjustable toward and away from each other, thus varying the size of said U-shaped opening.

The relative positions of the shoe support and the tubular cutter at the end of the heel seat reducing operation are constant and accordingly there is provided, in accordance with a further feature of the invention, a back gage which constitutes part of the shoe support and is constructed and arranged for movement into different adjusted positions upon the support to locate the shoe in different lengthwise positions upon said support in accordance with the size of the shoe to be operated upon, thereby insuring that the heel breast receiving shoulders formed upon the outsole of the shoe shall be formed at the proper positions lengthwise of the outsole.

The above and various other features of the invention will be understood and appreciated from the following detailed description read in connection with a preferred embodiment of the invention illustrated in the accompanying drawings, in which Figs. 1, 2 and 3 are front, side, and plan views, respectively, of the illustrative machine;

Figs. 4 and 5 are enlarged views, partly broken away, on line IV—IV of Fig. 3, showing the machine in the process of forming upon the outsole of a shoe shoulders which Louis and Cuban heels, respectively, abut;

Fig. 6 is a plan view, partly broken away, on line VI—VI of Fig. 4;

Fig. 8 is a perspective view showing crease plates of the machine and mechanism for supporting and adjusting said plates;

Fig. 12 is a section on line XII—XII of Fig. 5;

Fig. 13 is a view similar to Fig. 12, with parts broken away;

Fig. 14 is a section on line XIV—XIV of Fig. 12;

Fig. 15 is a side view of the shoe support of the illustrative machine;

Fig. 16 is a section on line XVI—XVI of Fig. 15;

Figure 18:
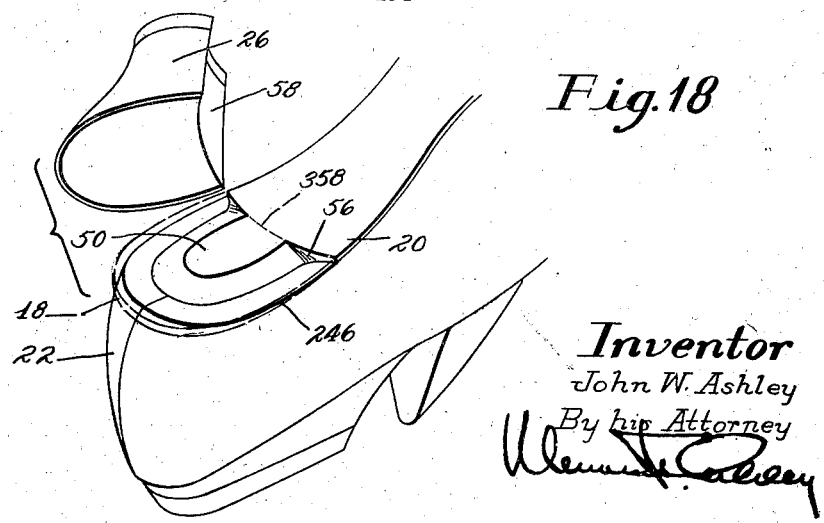
Figure 9:
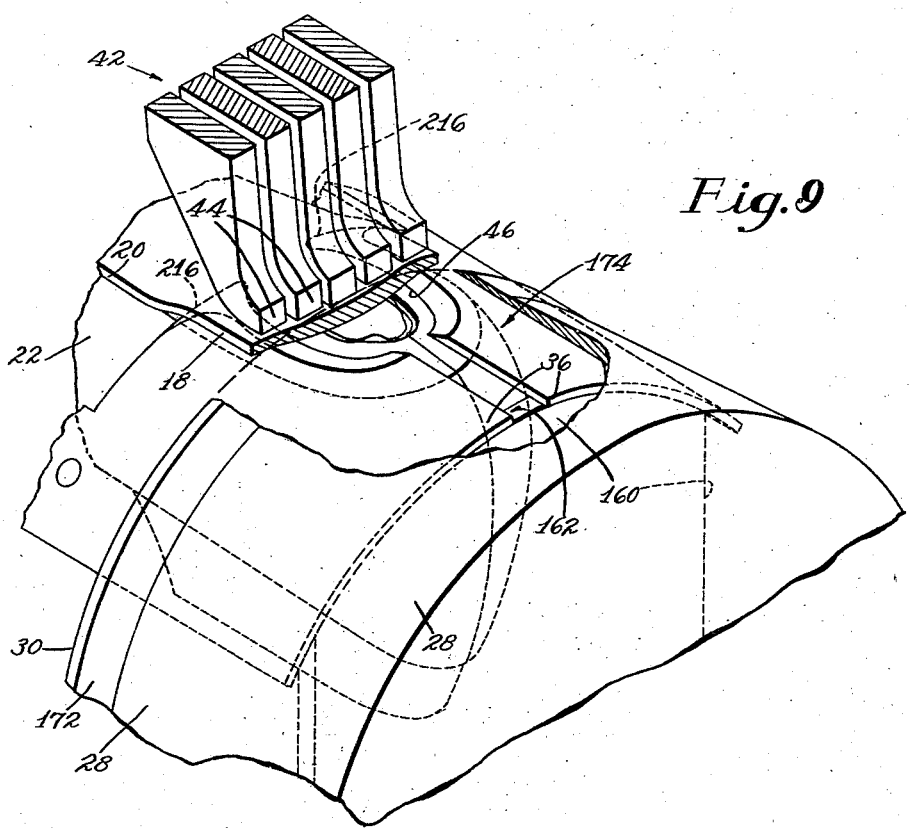
Figs. 9 and 10 are enlarged views showing the attached outsole of a shoe in the process of having its heel seat fitted in the illustrative machine for the reception of a heel.
Figure 10:
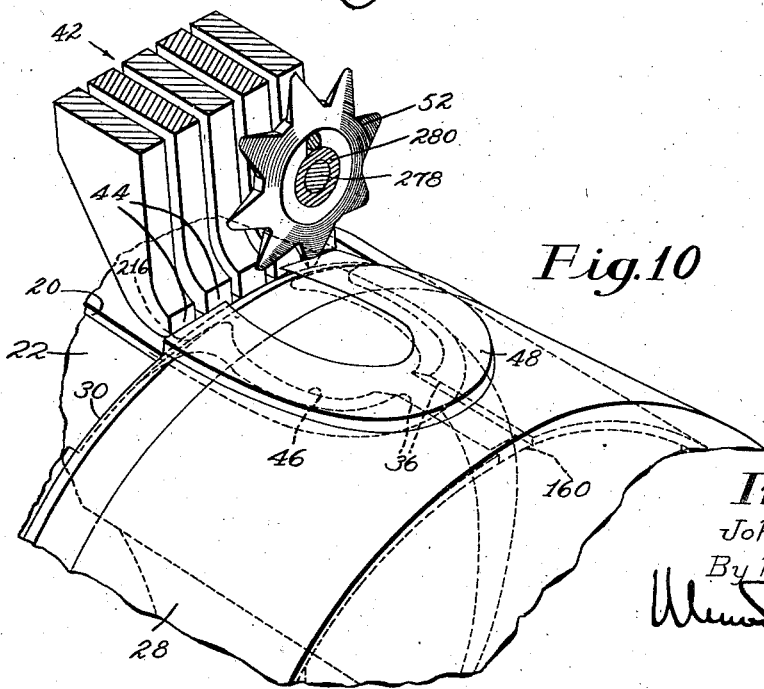

Figs. 17 and 18 are perspective views showing shoes the heel-seat portions of the attached outsoles of which have been fitted for the reception of Louis and Cuban heels, respectively, by the use of the illustrative machine; and Fig. 19 is a diagrammatic view showing the path of swinging movement of the outsole of the shoe mounted upon the support illustrated in Figs. 15 and 16 when the machine is operating upon Cuban work.

Figure 11:
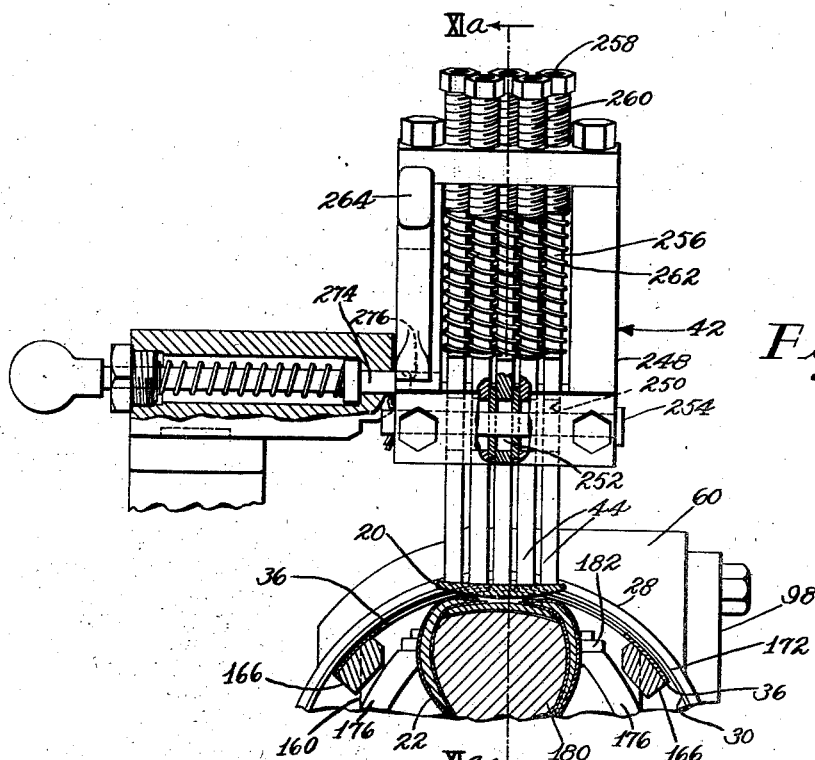
Fig. 11 is a view, partly in elevation and partly in section, on line XI—XI of Fig. 2.
Figure 11A:
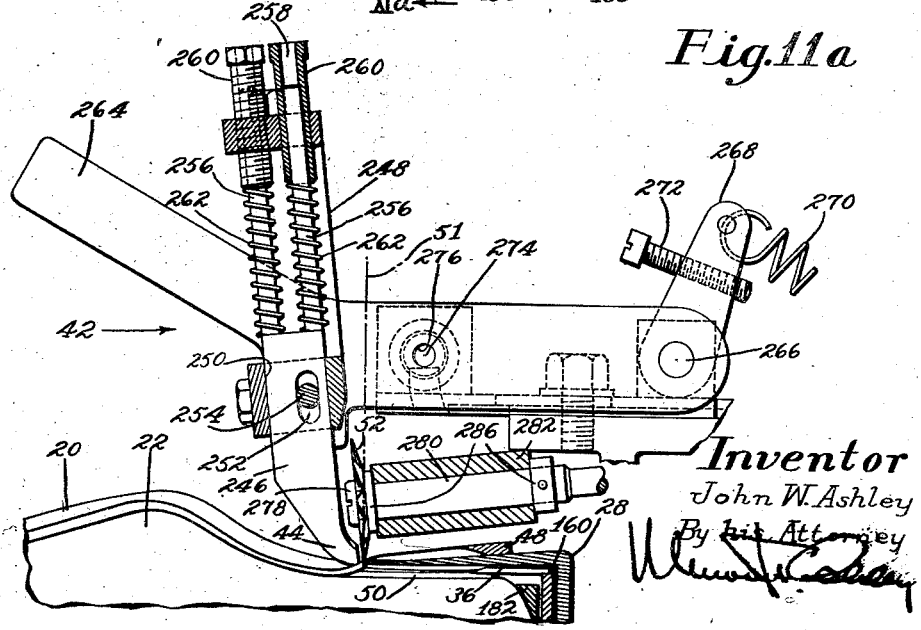
Fig. 11a is a view on line XIa—XIa of Fig. 11.

The illustrative machine will be described with reference to fitting the heel-seat portions 18 (Figs. 9, 15, 18 and 19) of attached outsoles 20 of women's shoes 22 for the reception of Louis and Cuban heels 24 (Fig. 17), 26 (Fig. 18), respectively, and comprises a tubular cutter 28 having a circular cutting edge 30 rotatable about a horizontal axis 32 (Figs. 2, 3, 6 and 7), and a carrier 34 (Figs. 1 to 3, 5 and 8) which is slidable lengthwise of said axis and supports a pair of matrix or crease plates 36 against which is forced, by mechanism hereinafter described, the heel-seat portion of the outsole of the shoe resting upon a support 40 (Figs. 2 to 5, 12 to 16) mounted upon the carrier. The machine is also provided with a presser member 42 (Figs. 1 to 3, 6, 7, 9 to 11a) comprising a plurality of spring-pressed plungers 44 constructed and arranged to force areas of the heel-seat portion of the outsole 20 arranged just in front of the cutting edge 30 of the cutter 28 against the matrix plates 36 and into a U-shaped opening 46 (Figs. 6 and 8 to 10) formed between said plates, means for moving the carrier 34 and accordingly the support 40 together with the matrix plates 36 toward the cutter 28 in a path parallel to said axis 32 to cause a horseshoe-shaped chip 48 (Figs. 4 to 7 and 10) to be removed from the heel-seat portion of the outsole supported by the crease plates, thereby forming a heel seat tab 50 (Figs. 17 and 18), and a power-driven toothed rotary cutter 52 which is movable bodily about the axis 32 in a plane 51 (Figs. 6, 7 and 11a) arranged transversely of the outsole and is in approximate engagement with but spaced from the cutting edge 30 of the heel seat reducing cutter 28 to form Louis heel breast receiving shoulders 54 (Fig. 17) upon and to remove the horseshoe-shaped chip 48 from the outsole. As will be explained later, in order to form laterally outcurved heel breast receiving shoulders 56 (Fig. 18) which are curved longitudinally of the outsole to accommodate the Cuban heel 26 which has a transversely incurved heel breast 58, means are provided whereby the shoe support may be swung laterally upon the work carrier 34, as will appear later, in response to and in timed relation with bodily movement of the shoulder forming cutter 52.

Figure 7:
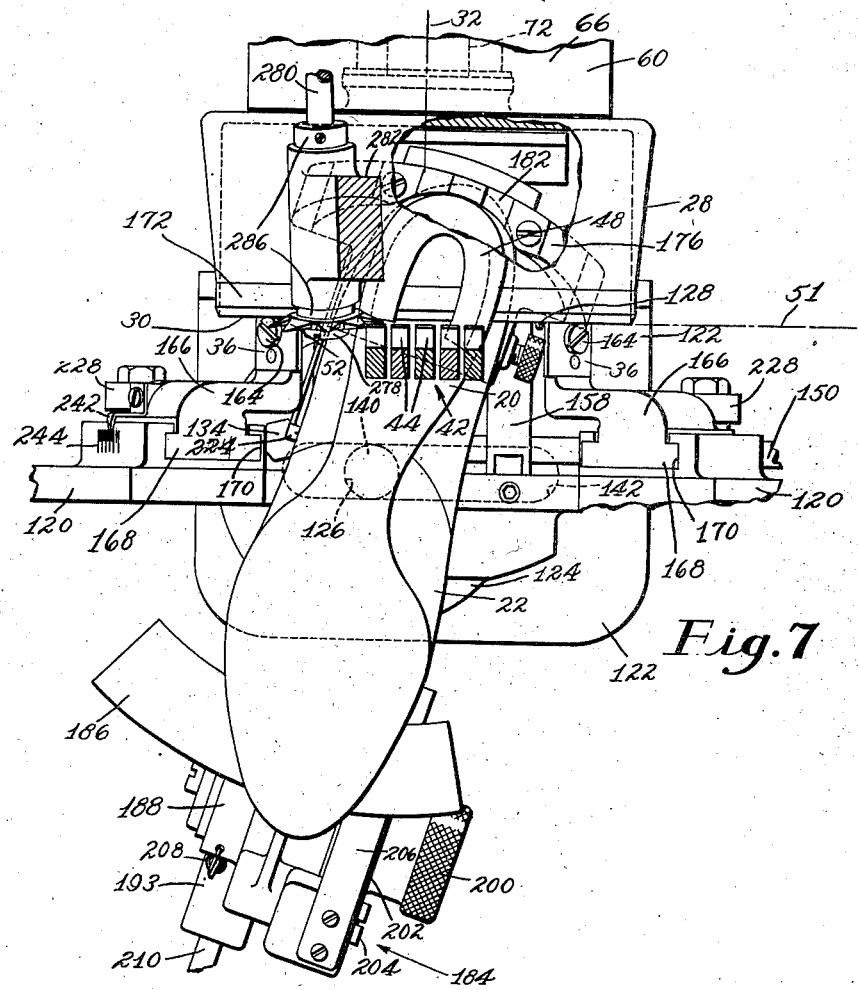
Fig. 7 is a plan view, partly broken away, on line VII—VII of Fig. 5.

A frame 60 of the machine is secured upon a pedestal 62 (Figs. 1 and 2) by screws 64 and comprises a housing 66 (Figs. 1 to 3 and 7) in bearings 68, 70 (Fig. 2) of which is rotatably mounted a drive shaft 72 (Figs. 2, 6 and 7). Threaded onto the forward end of the drive shaft 72 is the tubular cutter 28 and secured to the rear end of the shaft are pulleys 74, 76 (Figs. 2 and 3) which are operatively connected by a belt 78 to a pulley 80 secured to the forward end of a shaft 82 of an electric motor 84. The cutter shaft 72 is held in its proper lengthwise position in the bearing 70 by collars 90 (Fig. 2) which are pinned to the shaft and engage opposite ends of the bearing.

Pinned to bosses 94 (Figs. 2 and 3), 96 (Fig. 3) formed integral with plates 98, 100, respectively, bolted to opposite sides of the housing 66 are a pair of horizontally arranged bearing rods 102 (Figs. 1 to 5 and 8), 104 (Figs. 1, 3, 4 and 8), the carrier 34 being slidably mounted upon said rods which pass through a cylindrical bore 106 (Figs. 2 and 3) of a boss 108 of the carrier and through a recess 110 of said carrier, flat upper and lower surfaces 112 (Figs. 3, 4 and 8) of the rod 104 engaging upper and lower flat faces of the recess. Secured to the forward ends of the rods 102, 104 are stop collars 114 (Figs. 1 and 4), 116 (Figs. 1, 3 and 8) for limiting forward movement of the carrier 34 upon said rods, rearward movement of the carrier being limited by the engagement of the rear end of the boss 108 with a stop collar 118 (Figs. 2 and 3) secured to the rod 102.

The work carrier 34 may be moved manually back and forth along the bearing rods 102, 104 between said stop collars but is preferably operated along said rods by a treadle-operated link 109 (Fig. 2) which is pivoted at its forward end to said carrier and at its rear end to a bell-crank lever 111 secured to a fulcrum pin 113 mounted for rotation in the main frame 60. The bell-crank lever 111 is operatively connected through a link 115 (Figs. 1 and 2) to a treadle 117 which is pivoted upon a fulcrum pin 119 supported by the main frame 60 and is normally held in a raised position by a strong spring 121 (Fig. 2) which constantly urges the bell-crank lever 111 counterclockwise, as viewed in Fig. 2, and the carrier to its retracted idle position against the collars 114, 116. After the shoe has been positioned upon the support 40, by mechanism hereinafter described, the operator depresses the treadle 117, causing the heel-seat portion of the outsole of the shoe mounted upon the support to be presented to the tubular cutter 28 to trim the horseshoe-shaped chip 48 from said heel-seat portion. After forming, through mechanism which will be described later, the heel breast receiving shoulders 54, 56 and removing the horseshoe-shaped chip 48 from the outsole, the operator removes his foot from the treadle 117 and the carrier 34 actuated by the spring 121 moves forward to its retracted position against the collars 114, 116.

The carrier 34 comprises a vertically arranged plate 120 to which is secured a horizontal platform 122 having mounted on it a sector gear 124 provided with a cylindrical bore 126 (Fig. 14) and meshing with a rack 128 which is secured by screws 130 to an upstanding lip of the platform and the teeth of which have a pitch line 129 (Fig. 12). Secured by bolts 134 to the gear 124 is a bracket 136 of the shoe support 40, said bracket having a recess for receiving a boss of the gear. The bore 126 in the gear 124 is constructed and arranged to receive a guide pin 140 (Figs. 5, 6, 13 and 14) extending downward through an elongated transverse slot 142 formed in the platform 122. The guide pin 140 is provided at its lower end with a shoulder against which a washer 144 is forced by a nut 146, the arrangement being such that when the washer is forced against said shoulder the washer and a flange 148 of the guide pin 140 engage the upper face of the gear and the lower face of the support, respectively, with a slight amount of pressure so as to permit combined rotation and sliding movement of the gear 124 on the platform 122 when a link 150 which is pivotally connected to the upper end of the guide pin 140 is moved transversely of the machine, as will be hereinafter described.

When shoes 22 are being fitted for the reception of Louis heels 24, the gear 124 is secured to the platform 122 by a spring-pressed detent 154 (Figs. 1, 5, 6, 12, 13 and 14) which is carried by the platform and when rotated to a central position is permitted to enter a recess 156 in the gear. As will be hereinafter explained, when shoes 22 are fitted for the reception of Cuban heels 26, the detent 154 is withdrawn from the recess 156, the gear 124 being rotated, upon transverse movement of the link 150, in response to transverse movement of the shoulder forming cutter 52, in order to form generated cuts forming the heel breast receiving shoulders 56.

Fixed to and extending rearward from the vertical plate 120 of the carrier 34 are a pair of rods 158 the rear ends of which are secured to a header 160, an upper surface 162 (Figs. 6, 8, 15 and 16) of the header being centered about the axis of rotation 32 of the tubular cutter 28 and being constructed and arranged to support the rear ends of the matrix or crease plates 36. The front ends of the matrix plates 36 are secured by screws 164 to blocks 166 having dovetail arcuate portions 168 movable along arcuate guideways 170 (Figs. 3, 6, 7 and 8) which are formed in the vertical plate 120 and are arranged in concentric relation to the axis of rotation 32 of the tubular cutter 28. It will be noted that the matrix plates 36 are curved laterally in approximately concentric relation to a blade 172 of the tubular cutter 28, work supporting cylindrical surfaces 174 (Figs. 8 and 9) of the plates being arranged in close proximity to the inside cylindrical face of the blade 172. As above explained, the forward portions of the opposing margins of the matrix plates 36 form the U-shaped opening 46, margins of the plates surrounding the U-shaped opening being beveled. The matrix plates together may be referred to as a matrix and the plates may also be referred to as matrices.

The shoe supporting bracket 136 extends upward and rearward and has slidably mounted upon it a block 176 to which is secured by screws 177 (Figs. 4, 15 and 16) a leaf spring 178 constructed and arranged to be engaged by the cone of a last 180 upon which the shoe to be operated upon is mounted. Secured to an upstanding rear end portion of the block 176 is a back gage 182 (Figs. 4 to 7, 11 and 15) constructed and arranged to be engaged by the rear end of the shoe adjacent to its heel seat, the gage serving to position the shoe, the forward end of which engages a toe rest 184 (Figs. 1 to 3, 6 and 7) and the heel-seat portion of the outsole of which overlies the matrix plates 36, as above described, lengthwise upon the spring 178 and the toe rest, said members forming parts of the shoe support 40. Although the matrix plates 36 are not directly connected to the support 40, they afford support for the heel-seat portion of the outsole and may be considered as part of the support.

The toe rest 184 comprises an arcuate pad 186 secured to the upper end of a housing 188 which has a vertical bore 190 (Fig. 2) for receiving a rack 192 forming part of a slide 193 and meshing with a pinion 194 integral with a shaft 196 rotatably mounted in the housing. Secured to the shaft 196 outside said housing is a ratchet 198 (Figs. 1 and 2) and also a knurled hand grip 200 for turning the ratchet for the purpose of raising and lowering the housing upon the rack. The housing 188 is held in its adjusted position upon the rack 192 by a pawl 202 (Figs. 1, 2, 3 and 7) which is mounted upon a fulcrum pin 204 secured to the housing and is constantly forced against the ratchet 198 by a leaf spring 206. In order to insure against there being any vertical play between the housing 188 and the rack 192 and to cause the housing to move to its lowered position when the pawl 202 is lifted out of engagement with the rack 198, there is provided a tension spring 208 the lower end of which is fixed to the slide 193 and the upper end of which is fixed to the housing 188.

In order to enable the pad 186 to be moved into different adjusted positions lengthwise of the shoe support 40, the slide 193 is supported by a forwardly extending bar 210 secured to the bracket 136, said bar having at its lower surface teeth 212 (Fig. 2) against which spring-pressed detents 214 carried by the slide 193 are constantly urged to keep the slide from moving from its adjusted position upon the bar. The slide 193 may be adjusted by hand into different positions along the bar 210 after moving the detents 214 away from the teeth 212 of the bar.

As above explained, in fitting the heel-seat portion of the outsole of the shoe mounted upon the support, the carrier 34 is moved rearward upon the rods 102, 104 until the boss 108 (Figs. 2, 3 and 8) of the carrier engages the fixed collar 118 of the rod 102, front edges 216 (Figs. 8, 9 and 10) of the matrix plates 36 at such time being in approximate engagement with the cutting edge 30 of the cutter 28. Since the fitted heel seats of shoes of different sizes are of different lengths, it will be apparent that shoes of different sizes must be initially located in different lengthwise positions upon the shoe support 40 preparatory to reducing the outsole. Accordingly, the back gage 182 and the leaf spring 178 are adjustable forward and rearward upon the bracket 136 by turning an adjusting nut 218 (Figs. 4, 5, 15 and 16) rotatable in the bracket and having threaded into it an extension of the block 176. The adjusted position of the back gage 182 and the leaf spring 178 with relation to the bracket 136 may be readily determined at a glance by the use of a pointer 224 (Figs. 4, 15 and 16) secured to the block 176 and movable, upon lengthwise adjustment of the block upon the bracket, along a scale 225 graduated for both Louis and Cuban work. The block 176 may be rigidly secured in its different adjusted positions to the bracket 136 by a setscrew 226 threaded into the block 176 and having its end in forced engagement with the bracket.

With a view to varying the width of the heel seat tab 50 of the outsole 20 in accordance with the size of the shoe to be operated upon, the matrix plates 36 are initially adjustable about the axis 32 of rotation of the cutter 28 by mechanism which will now be described. Pivotally connected to each of the matrix plate supporting blocks 166 which, as above explained, are movable in arcuate guideways 170 centered about the axis 32, is one of a pair of arms 228 the lower ends of which are pivoted to a crossbar 230 (Figs. 1, 2 and 8) having pinned to it a cylindrical plunger 232 slidingly mounted in a recess 234 of the plate 120 of the carrier 34. Threaded into the crossbar 230 is a screw 236, said screw being held in different adjusted positions in the crossbar by a lock nut 238. The upper end of the screw 236 is constantly held in engagement with the lower end of the plate 120 by a pair of strong springs 240 the upper ends of which are attached to the plate and the lower ends of which are attached to the crossbar 230. The crease plates 36 may be readily moved away from each other to facilitate the positioning of the shoe upon the support 40 by the use of a treadle 237 (Figs. 1 and 2) which is mounted upon a fulcrum pin 239 carried by the machine frame 60 and is operatively connected by a link 241 to the cylindrical plunger 232. In order that the machine operator may determine at a glance the widthwise setting of the matrix plates 36 in accordance with the width of the heel which is to be attached to the shoe about to be operated upon, the arcuate portion 168 of each of the blocks 166 has secured to it a pointer 242 (Figs. 6, 7 and 8) arranged in close proximity to a suitably graduated scale 244 on the plate 120.

In fitting the heel-seat portion 18 of the outsole 20 of the shoe 22 for the reception of a heel, after properly adjusting the block 176 to which the back gage 182 and the leaf spring 178 are secured the shoe is positioned upon the support 40 with its rear end in engagement with the back gage, the crown of the last 180 being in engagement with the spring 178, as best illustrated in Fig. 15, and the toe of the shoe being in engagement with the pad 186. The leaf spring 178 forces the overlasted counter portion of the shoe, the margin of which has a break line 246 (Fig. 18) arranged in a plane, against the underside of the matrix plates 36 and thus serves, together with the back gage 182 and the toe rest 186, to retain the shoe quite rigidly upon the shoe support 40. After positioning the shoe upon the support 40, the operator swings the presser member 42 downward, causing the spring-pressed plungers 44 thereof to be forced against areas of the heel-seat portion 18 of the outsole 20 located just forward of the cutting edge 30 of the cutter 28, the central plungers forcing the heel-seat portion into the opening 46 of the matrix plates 36 and the outer plungers forcing the lateral margins of said heel-seat portion against the cylindrical outside surfaces 174 of the matrix plates.

The presser member 42 comprises a housing 248 (Figs. 1 to 3, 11 and 11a) having a plurality of guideways 250 (Figs. 11 and 11a) for receiving the plungers 44 which are provided with elongated slots 252 through which passes a pin 254 secured in the housing. Each of the plungers 44 is provided with a cylindrical shank 256 fitting in a recess 258 of a guide screw 260 threaded into the housing 248, springs 262 being interposed between the guide screws and shoulders on the plungers. The presser member 42 is mounted upon a lever 264 secured to one end of a shaft 266 rotatably mounted in a bore of the machine frame 60, and secured to the other end of the shaft is an arm 268 to which is secured a tension spring 270 the rear end of which is attached to the machine frame. The lever 264 is swung counterclockwise, as shown in Fig. 2, from its dash line position, in which a stop screw 272 carried by the lever is held by the spring 270 against the machine frame, to an operative position in which a spring-pressed detent 274 mounted upon the frame is moved into a recess 276 formed in the lever 264. When the presser member 42 is in its operative position, the spring-pressed plungers 44 force the heel-seat portion 18 of the outsole 20 attached to the shoe 22 against the cylindrical surfaces 174 of the matrix plates 36 and into the U-shaped opening 46, as above described. As the shoe support 40 and the matrix plates 36, together with the shoe positioned thereon, are moved rearward into the interior of the tubular cutter 28, the horseshoe-shaped chip 48 trimmed by slicing cuts from the heel-seat portion 18 of the outsole 20 rides up over the top of the cutter 28, thereby forming the heel seat tab 50 which overlies the U-shaped opening 46 and underlies the inside cylindrical face of the blade 172 of the cutter. At the end of the heel seat reducing operation the tubular cutter 28 supports the horseshoe-shaped chip 48 and may be referred to as a support therefor.

The shoulder forming cutter 52 is secured by a screw 278 to the forward end of a shaft 280 which is rotatably mounted in an arm 282 of a rocker block 284, the shaft being secured against lengthwise movement in the block by collars 286 (Figs. 3, 6, 7 and 11a). The rear end of the shaft 280 is pinned to a universal coupling 288 (Figs. 2 and 3) operatively connected to the forward end of a shaft 290 which is rotatably mounted in a bearing 292 secured by a screw 294 (Fig. 2) and a dowel pin to the housing 66, a pulley 296 being secured to the shaft and operated through a belt 298 driven by the pulley 74.

The rocker block 284 is rotatably supported upon a rod 300 (Figs. 1 to 5) secured at its forward end to a holder block 302 having a depending arcuate slide portion 304 fitting in an undercut arcuate guideway 306 (Figs. 4, 5 and 8) which is formed in the front portion of the plate 120 of the carrier 34 and is centered about the axis of rotation 32 of the tubular cutter 28. The rocker block 284 has threaded in it and secured to it by a lock nut 308 a screw 310 the lower end of which is constantly forced against a flat face 312 (Figs. 2 and 3) of a cam 314 by a spring-pressed plunger 316 (Figs. 2, 4 and 5) mounted in a recess 318 of the rocker block 284. The forward end of the cam 314 fits in a channel 320 of the holder block 302 and is provided with an elongated slot 322 (Figs. 2 and 5) through which passes a screw 324 which is threaded into the holder block and serves to secure the cam to said block. The rocker block 284 is supported against movement lengthwise of the rod 300, which is parallel to the axis 32 of the heel seat reducing or tubular cutter 28, by an abutment 326. The abutment 326 is secured at its lower end to the rod 102 and has its upper end fitting in a slot 328 formed between bifurcations of the rocker block 284, the arrangement being such that the acting or working teeth of the shoulder forming cutter 52 are at all times arranged approximately in the plane 51 (Figs. 6, 7 and 11a) which, as above stated, is positioned just forward of the plane of the cutting edge 30 of the heel seat reducing cutter 28.

Figure 1:
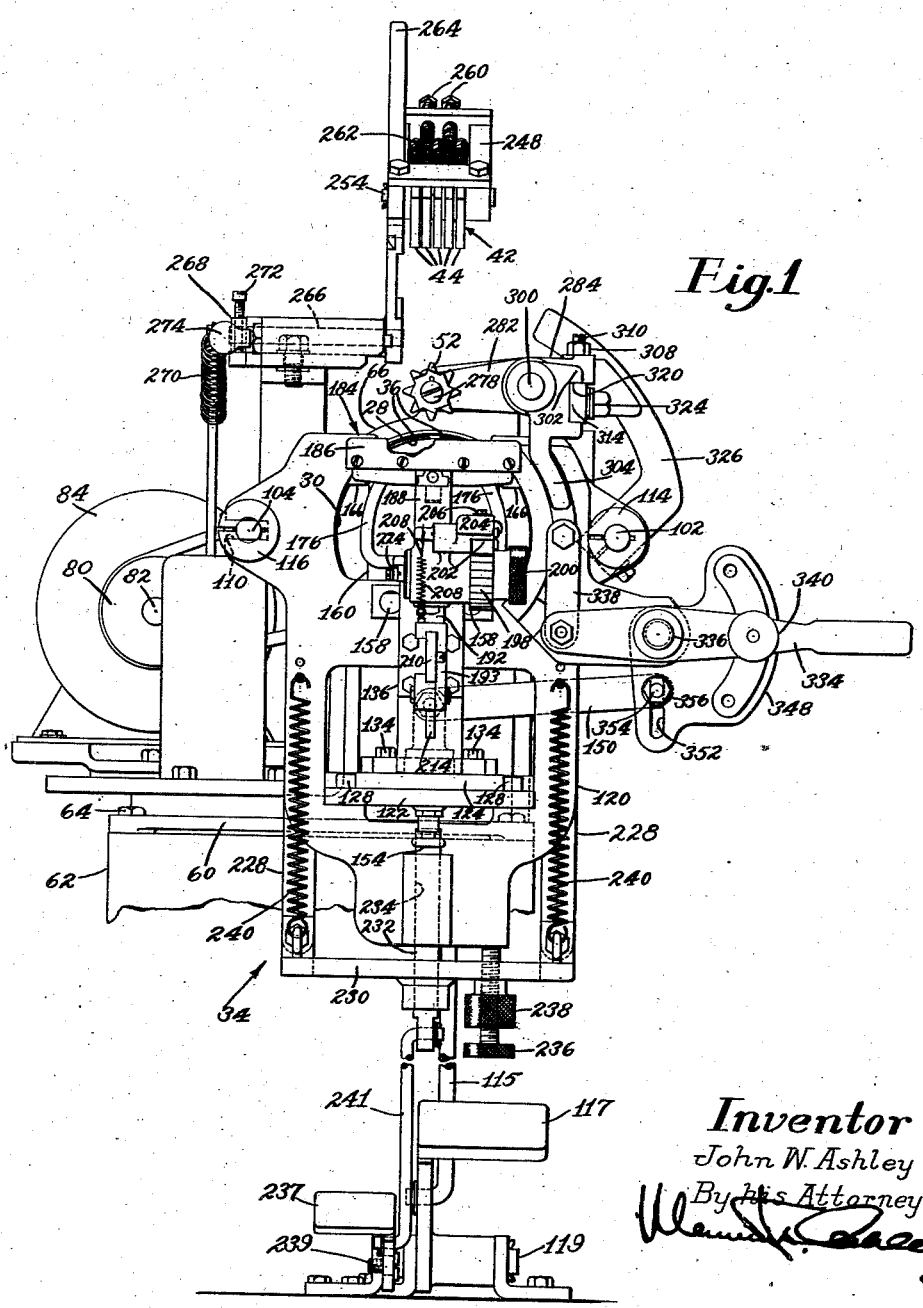

When the carrier 34 is in its forward or idle position shown in Figs. 2 and 3, the screw 310 carried by the rocker block 284 is held in forced engagement with the face 312 of the cam 314, which face may be referred to as the low portion of the cam, by the spring-pressed plunger 316, the cutter 52 then being held in its raised idle position a considerable distance from the heel seat reducing cutter 28, as shown in Fig. 1. During the rearward movement of the carrier 34 on the rods 102, 104, the outsole 20 of the shoe 22 mounted upon the shoe support 40 is pressed against the matrix plates 36 and into the U-shaped opening 46 by the plungers 44 of the presser member 42, and is forced against the cutting edge 30 of the cutter 28 to form the heel seat tab 50, as above described, the shoulder forming cutter 52 at that time being held approximately in a heightwise median plane 231

(Figs. 6 and 19) of the outsole of the shoe, in its raised position away from the heel seat reducing cutter 28 by reason of the engagement of the screw 310 of the rocker block 284 with the low portion 312 of the cam 314. When the collar 118 upon the bearing rod 102 is engaged by the boss 108 of the carrier 34 to limit rearward movement of the carrier, the front edges 216 of the matrix plates 36 are arranged just forward of the plane of the cutting edge 30 of the cutter 28, the screw 310 having ridden up an inclined face of the cam 314 onto a high face 330 (Figs. 2 to 5) of said cam, causing the cutter 52 to be swung bodily downward about the shaft 300 into a position in which the teeth of the cutter extend just below the cutting edge 30 of the heel seat reducing cutter 28 and just overlie, but do not engage, the median portion of the outsole, the horseshoe-shaped chip 48 extending over the cutting edge 30 at opposite sides of the shoulder forming cutter.

The power-driven shoulder forming cutter 52 is then swung bodily about the axis of rotation 32 along the cutting edge 30 of the heel seat reducing cutter 28 by swinging a lever 334 (Figs. 1 to 5) which is rotatably mounted upon a fulcrum pin 336 secured to an extension of the plate 120 of the carrier 34, the inner end of the lever being operatively connected by a link 338 to the arcuate slide portion 304 of the holder block 302 which carries the shaft 300. When the heel-seat portions 18 of outsoles 20 of shoes 22 are fitted for the reception of Louis heels 24 (Fig. 17), the shoulders 54 are arranged approximately in a plane for engagement by the forward end of the lip of the Louis heel. It will thus be apparent that in order to form the heel breast receiving shoulders 54 arranged approximately in a plane it is desirable to have the shoe remain stationary while the shoulder forming cutter 52 is moved along the cutting edge 30 of the heel seat reducing cutter 28 to form said shoulders.

When, however, the heel-seat portions 18 of outsoles 20 attached to shoes 22 are being prepared for the reception of Cuban heels 26 (Fig. 18), the breasts of which are transversely incurved and in the finished shoe engage the convex shoulders 56 formed upon the outsole, the bracket 136 of the shoe support 40 is swung, as will be explained later, as the shoulder forming cutter 52 moves along the cutting edge 30 of the heel seat reducing cutter 28, with the result that generated cuts are produced forming the outcurved heel breast receiving shoulders 56.

In order to swing the shoe support 40 in timed relation with the shoulder forming cutter 52 in the formation of the heel breast receiving shoulders 56, the lever 334 carries a spring-pressed detent 340. When a pin 342 carried by the detent 340 rests in a shallow slot 344 of the lever 334, said detent is spaced from a recess 346 in a quadrant 348 pivotally mounted upon the fulcrum pin 336 and accordingly movement of the lever does not effect movement of the quadrant. When, however, the detent 340 has been rotated to such a position in the lever 334 that its pin 342 fits in a deep slot 350 of the lever, said detent, upon swinging movement of the lever, registers in the recess 346 of the quadrant 348, with the result that movement of the lever 334 about the axis of the fulcrum pin 336 causes a corresponding angular movement of the quadrant about the axis of said pin. The coupling arrangement between the lever 334 and the quadrant 348 is such that the cutter 52 is arranged approximately in its central position directly above the central heel breast line portion of the outsole of the shoe when the heightwise median plane 231 of the outsole is in its central position disposed at approximately right angles to the plane of the cutting edge 30 of the tubular cutter 28.

The quadrant 348 is provided with a slot 352 and is operatively connected to the link 150 by a shouldered pin 354 which has a threaded shank portion passing through the slot and may be secured in different selected positions in the slot by a nut 356 threaded onto said shank portion. The inner end of the link 150, as above explained, is pivotally connected to the guide pin 140 which extends downward through the cylindrical bore 126 in the sector gear 124, through the elongated slot 142 in the platform 122, and is held coupled to the gear by the nut 146. When the quadrant 348 is coupled to the lever 334, swinging movement of the lever upon the pin 336 causes the pin 140 to move lengthwise of the slot 142 in the platform 122, with the result that the gear 124 meshing with the rack 128 will rotate in and move to a slight extent as a unit lengthwise of the slot.

As above stated, the general plane of movement 51 (Figs. 6, 9 and 11a) of the shoulder forming cutter 52 passes approximately through the pitch line 129 (Fig. 12) of the teeth of the rack 128 when the carrier 34 is in its rearward position, the gear 124 having a radius of approximately two-and-one-quarter inches, which is equal to the radius of transverse curvature of the breast 58 of the Cuban heel 26 and accordingly approximately equal to the longitudinal curvature of a heel breast line 358 (Fig. 18) of the outsole.

When the detent 340 registers in the recess 346 of the quadrant 348 and the lever 334 has been swung to a horizontal position, the heightwise median plane 231 (Figs. 6 and 19) of the outsole of the shoe mounted upon the shoe support 40 is arranged at approximately right angles to the plane of the cutting edge 30 of the tubular cutter 28. The operator then moves the carrier 34, upon which the shoe support 40 is mounted, rearward against the stop collar 118, causing the horseshoe-shaped chip 48 to be sliced from the periphery of the heel-seat portion of the outsole and causing the shoulder forming cutter 52 to swing down about the axis of the rod 300 into a position in which it is arranged just over the center of the heel breast line 358 (Figs. 18 and 19) of the outsole and just below and forward of the cutting edge 30 of the tubular cutter 28.

In order to insure the formation of smooth heel breast receiving shoulders 56 extending along the longitudinally curved heel breast line 358 of the outsole, the shoe support 40 is rotated, together with the gear 124, and is moved lengthwise of the transverse slot 142 (Figs. 5, 7 and 12 to 14) in the platform 122. It will be noted that when the carrier 34 has moved rearward against the stop collar 118 to slice the horseshoe-shaped chip 48 from the periphery of the heel-seat portion of the outsole of the shoe, the point A (Fig. 19) at the central part of the heel breast line 358 of the outsole lies in a vertical axis extending downward approximately through the point of tangency of the pitch line of the gear 124 with the pitch line 129 (Fig. 12) of the teeth of the rack 128, the shoulder forming cutter 52, as above stated, at such time being arranged just above point A. When the lever 334 is raised from its horizontal position, the shoulder forming cutter 52 is moved to the right, as viewed from the front of the machine, along the cutting edge 30 of the tubular cutter 28 and simultaneously therewith the outsole is swung horizontally in such a path that the point A upon the outsole travels approximately in a cycloidal path to A', the heel breast line 358 of the outsole rolling laterally on the general plane 51 of movement of the shoulder forming cutter 52, which plane includes the pitch line 129 of the teeth of the rack 128, the construction and arrangement of the machine being such that the portion of the heel breast line 358 being trimmed is always approximately tangent to said plane.

After one heel breast receiving shoulder 56 has been formed upon the outsole, the operator depresses the lever 334, causing the cutter 52 to move to the left, as viewed from the front of the machine, along the cutting edge 30 of the tubular cutter 28 back to its central position in timed relation with the support 40, which also moves the shoe back to its central position. Continued depression of the lever 334 from its horizontal position causes the support to swing the outsole horizontally in such a path that the point A on the outsole travels in a cycloidal path to A" as the portion of the heel breast line 358 to the left of the heightwise median plane 231 of the outsole 20 rolls along the plane 51, the construction and arrangement of the machine being such that the section of the heel breast line portion of the outsole being operated upon by the shoulder forming cutter 52 is always approximately tangent to the plane 51. The operator then raises the lever 334 until it is approximately horizontal, to move the shoulder forming cutter 52 and the shoe 22 back to their central positions.

The vertical axis about which the attached outsole 20 of the shoe 22 is swung laterally while maintaining the break line 246 (Fig. 18) of the heel seat of the shoe in its plane extends heightwise of the shoe and shifts laterally or transversely of the outsole as the shoulder forming cutter 52 moves bodily transversely of said outsole about the axis 32 in the general plane 51.

By providing means for moving the central heel breast line portion of the outsole of the shoe mounted upon the support 40 in approximately cycloidal paths A—A', A—A" which intersect in a cusp lying approximately in the plane 51 of bodily movement of the shoulder forming cutter 52, it will be apparent that the heel breast line 358, which is approximately circular as viewed from above, will roll on said plane 51, the timing being such that the shoulder forming cutting upon the outsole takes place progressively approximately at the points of tangency of said heel breast line with the plane 51.

It will be understood that the curvature of the heel breast receiving shoulders 56 lengthwise of the shoe may be varied slightly, in order in the finished shoe better to fit the transverse curvature of the breast of the heel, by changing the operative position of the screw 354 in the slot 352 of the quadrant 348, thereby changing slightly the timing between the shoulder forming cutter 52 and the shoe support 40. When such an adjustment is effected, the different sections of the heel breast line portion of the outsole being operated upon by the cutter 52 will not be tangent to the general plane 51 of bodily movement of the shoulder forming cutter 52. It has been found, however, that even though sections of the heel breast line portion of the outsole being cut are displaced somewhat from their tangential relation with the plane 51, a satisfactory heel breast receiving shoulder may be formed. It will be apparent that with the above-described construction and arrangement the front and rear portions of the shoe support 40 move from side to side in opposite directions during the formation of the heel breast receiving shoulders 56 and may be defined as having such movement.

The operation of the machine will now be briefly described. When the machine is idle, the work carrier 34 (Figs. 1 to 3, 5 and 8) is in its retracted position against the collars 114 (Figs. 1 to 4), 116 (Figs. 1, 3 and 8). Preparatory to operating the machine, the back gage 182 (Figs. 4 to 7, 11 and 15) is adjusted to its proper lengthwise position upon the shoe support 40, the matrix plates 36 are adjusted to their proper widthwise positions, and the toe rest 184 is moved to the desired heightwise and lengthwise position. The operator then depresses the treadle 237 (Figs. 1 and 2) to open the matrix plates 36, places the last 180 upon which the shoe is mounted upon the leaf spring 178 (Figs. 4, 5, 15 and 16) of the shoe support 40 and slides the shoe rearward until its rear end engages the back gage 182, the heel-seat portion of the outsole overlying the matrix plates 36 and the extreme rear end of the outsole overlying the constantly rotating tubular cutter 28. As the shoe is moved against the back gage 182, the treadle 237 is released, causing the matrix plates 36 to move inward under the action of the spring 230 to their operative positions determined by the setting of the screw 236.

The lever 264 is next swung forward and downward until the spring-pressed detent 274 enters the recess 276 (Figs. 3, 11 and 11a) in said lever, causing the spring-pressed plungers 44 of the presser member 42 to force an area of the heel-seat portion of the outsole arranged just ahead of the cutting edge 30 of the tubular cutter 28 against the cylindrical surfaces 174 (Figs. 8 and 9) of the matrix plates 36 and into the U-shaped opening 46 formed between said plates. The operator then depresses the treadle 117 (Figs. 1 and 2) while gripping the forepart of the shoe and constantly forcing it against the back gage 182, causing the carrier 34 to slide rearward on the rods 102, 104 until the boss 108 (Figs. 2, 5 and 8) on the carrier engages the stop collar 118 on the rod 102, with the result that the outsole, flexed to a predetermined shape between the matrix plates 36 and the plungers 44, is forced, while firmly held, against the cutting edge 30 of the tubular cutter 28 to cause the horseshoe-shaped chip 48 to be trimmed from the periphery of the heel-seat portion of the outsole by slicing cuts.

When the carrier 34 engages the stop collar 118, the forward edges 216 (Figs. 8, 9 and 10) of the matrix plates 36 are arranged approximately in the plane of the cutting edge 30 of the tubular cutter 28. Just before the carrier 34 reaches the rearward limit of its movement, the cam 312 (Figs. 2 and 3) moves the rocker block 284 counterclockwise, as viewed from the front of the machine, until the cutting teeth of the shoulder forming cutter 52 are arranged just above the center of the heel breast line 358 of the outsole and just below and in front of the cutting edge 30 of the tubular cutter 28.

Assuming that the machine has been initially set to accommodate Cuban work, the detent 340 (Figs. 1 to 5) of the lever 334 having been moved into the recess 346 (Figs. 2, 3 and 4) of the quadrant 348 and the gear locking detent 154 having been withdrawn from the recess 156, the operator raises the lever 334 from its then horizontal position, causing the shoulder forming cutter 52 to be moved bodily to the right, as viewed from the front of the machine, along the cutting edge 30 of the tubular cutter 28 and causing the heel-seat portion of the shoe on the support to swing counterclockwise, as viewed from above, in the general plane of its break line 246 about a laterally shifting axis, as above described, to form one heel breast receiving shoulder 56. The lever 334 is then depressed to form the other heel breast receiving shoulder 56 and is then moved back to its horizontal position, causing the shoulder forming cutter 52 and the shoe support 40 to be moved back to their central positions.

The operator then withdraws the detent 274 from the recess 276, to allow the presser member 42 to be moved to its raised, inoperative position under the action of the spring 270, and removes his foot from the treadle 117 to allow the carrier 34 to move under the action of the spring 121 (Fig. 2) forward to its retracted position against the collars 114, 116. The shoe is then removed from the machine preparatory to operating upon the next shoe.

As above explained, when operating upon Louis work, the shoe support 40 is at all times rigidly secured to the carrier 34 by the locking detent 154, the shoe remaining stationary as the shoulder forming cutter 52 moves along the cutting edge 30 of the tubular cutter 28 to form the heel breast receiving shoulders 54.

Having described my invention, what I claim as new and desire to secure by Letters Patent of the United States is:

1. In a heel seat fitting machine, a cutter movable transversely of an outsole of a shoe, and means operative in timed relation with the cutter for swinging the outsole about an axis which extends heightwise of the shoe and shifts laterally of said outsole as the cutter is moved transversely of said outsole.

2. In a heel seat fitting machine, a cutter movable transversely of an attached outsole of a shoe, and means operative in timed relation with the cutter for swinging the heel-seat portion of the shoe laterally in the general plane of its break line as the cutter is moved transversely of said outsole.

3. In a heel seat fitting machine, a cutter, mechanism for moving the cutter transversely across an attached outsole of a shoe, and means operative in response to movement of and in timed relation with the cutter for swinging the heel-seat portion of the shoe from side to side while maintaining the general plane of the break line of said heel-seat portion approximately parallel to itself as the cutter is moved transversely across said outsole.

4. In a heel seat fitting machine, a support for a shoe having an attached outsole, a shoulder forming cutter movable in a plane transversely of said outsole, and means for swinging the support, while the shoulder forming cutter moves in said plane, about an axis which extends heightwise of the shoe upon the support and shifts laterally parallel to itself in said plane.

5. In a heel seat fitting machine, a support for a shoe having an attached outsole, a cutter movable transversely of said outsole in a plane to form heel breast receiving shoulders on said outsole, and means for swinging an approximately circular heel breast line of the outsole of the shoe mounted upon the support, which line is curved lengthwise of the outsole, in tangential relation with the plane of movement of the cutter while the cutter moves transversely of said outsole.

6. In a heel seat fitting machine, a support for a shoe having an attached outsole, a shoulder forming cutter movable in a plane transversely of the outsole of the shoe mounted upon the support, and means movable in timed relation with the cutter for moving forward and rear ends of the support from side to side in opposite directions to cause the cutter to form on said outsole heel breast receiving shoulders which are curved lengthwise of the outsole and are constructed and arranged to receive a Cuban heel.

7. In a heel seat fitting machine, a support for a shoe, a shoulder forming cutter, means for moving the cutter heightwise and widthwise of the shoe mounted upon the support in a plane, and means operative in timed relation with the cutter for swinging the forward and rear ends of the support laterally in opposite directions.

8. In a heel seat fitting machine, a shoulder forming cutter bodily movable transversely of an outsole of a shoe in a plane, and means for moving a central heel breast line portion of the outsole in approximately a cycloidal path as the cutter moves transversely of said outsole.

9. In a heel seat fitting machine, a shoulder forming cutter bodily movable transversely of an outsole of a shoe in a plane, and means for moving a central heel breast line portion of the outsole in approximately cycloidal paths which form a cusp lying approximately in the plane of movement of the cutter.

10. In a heel seat fitting machine, a support for a shoe, a power-driven toothed rotary cutter mounted for movement transversely of an outsole of a shoe, and means operative in timed relation with the cutter for moving a portion of the support in a cycloidal path as the cutter moves transversely of the outsole.

11. In a heel seat fitting machine, a support for a shoe having an attached outsole, a shoulder forming cutter movable transversely of said outsole in a plane, and means operative in timed relation with the cutter for imparting approximately cycloidal movement to a portion of said outsole as the cutter moves transversely thereof, said means being so constructed and arranged that the cutter at all times trims the outsole along portions of a longitudinally curved heel breast line thereof which are tangent to said plane.

12. In a heel seat fitting machine, a support for a shoe, means for trimming material from the periphery of the heel-seat portion of an outsole of the shoe mounted upon the support, a cutter movable in a fixed path transversely of the outsole to remove from said outsole material trimmed from the periphery of the outsole by said means and to form heel breast receiving shoulders on the outsole, and means operative in timed relation with the cutter for moving the support and accordingly the shoe into different angular positions with relation to the path of movement of the cutter as said cutter is moved transversely of the outsole.

13. In a heel seat fitting machine, a support for a shoe, means for trimming material from the periphery of the heel-seat portion of an outsole of a shoe mounted upon the support, a cutter movable bodily in a predetermined path transversely of the outsole to remove from said outsole material trimmed from the periphery of the outsole by said means and to form heel breast receiving shoulders on said outsole, and means operative in timed relation with said cutter for swinging the heel-seat portion of the shoe approximately in the general plane of its break line into different angular positions with relation to the path of movement of the cutter.

14. In a heel seat fitting machine, a cutter, means for rotating the cutter, a support for a shoe, means for effecting relative translatory movement between said cutter and the support in a rectilinear path to trim material simultaneously from the opposite lateral margins of the heel-seat portion of an outsole of the shoe, and means for thereafter effecting relative swinging movement between the cutter and the support to trim alternately material from the opposite lateral margins of the heel-seat portion of the outsole.

15. In a heel seat fitting machine, a cutter, means for rotating the cutter, a support for a shoe, means for effecting relative movement of translation between the cutter and the support in a rectilinear path to trim material simultaneously from the opposite lateral margins of the heel-seat portion of an outsole of the shoe, and means for thereafter effecting relative cycloidal movement between the cutter and a portion of the support to trim alternately material from the opposite lateral margins of the heel-seat portion of the outsole.

16. In a heel seat fitting machine, a rotatable cutter having a cutting edge, means for rotating the cutter, a support for a shoe, means for effecting relative movement of translation between the cutter and the support in a rectilinear path to trim material simultaneously from the opposite lateral margins of the heel-seat portion of an outsole of the shoe, means for thereafter effecting relative swinging movement between the cutter and the support to trim alternately material from the opposite lateral margins of the heel-seat portion of the outsole, and a cutter movable transversely of the outsole along the cutting edge of said rotatable cutter for forming heel breast receiving shoulders upon the outsole and for removing said material from the outsole.

17. In a heel seat fitting machine, a rotatable cutter having a cutting edge arranged in a plane, means for rotating the cutter, a support for a shoe, means for effecting relative movement of translation between the cutter and the support in a rectilinear path to trim material simultaneously from the opposite lateral margins of the heel-seat portion of the outsole of the shoe, a shoulder forming cutter movable along the cutting edge of the first-named cutter approximately in the plane in which the cutting edge of the cutter is arranged, and means for moving a portion of the support in a cycloidal path as the shoulder forming cutter moves along the cutting edge of the first-named cutter.

18. In a heel seat fitting machine, a cutter having a curved cutting edge, means for moving the cutter lengthwise of its cutting edge, a support for a shoe, means for effecting relative movement of translation of the cutter and the support lengthwise of the shoe to trim material simultaneously from opposite lateral margins of the heel-seat portion of the outsole by cuts progressing toward a heel breast line of the outsole, and means for thereafter effecting relative swinging movement of the cutter and the support to form alternately forward continuations of said cuts.

19. A heel seat fitting machine having, in combination, a tubular cutter, means for rotating the cutter about an axis, a support for a shoe, means for moving the support lengthwise of said axis with relation to the cutter to cause material to be trimmed simultaneously by slicing cuts from opposite sides of the heel-seat portion of an outsole of the shoe, means for limiting said movement of the support lengthwise of said axis, and means for thereafter effecting relative swinging movement of the cutter and the support to form continuations of said slicing cuts.

20. In a heel seat fitting machine, a support for a shoe having an attached outsole, a shoulder forming cutter movable bodily transversely of said outsole approximately in a plane, a fixed rack having teeth the pitch line of which is arranged in the general plane of movement of the cutter, a pinion secured to the support, and means operative in timed relation with the shoulder forming cutter for rotating the pinion along said rack to cause a portion of the support to move in cycloidal paths which form a cusp lying approximately in said plane as the shoulder forming cutter moves transversely of the outsole.

21. A heel seat fitting machine having, in combination, a tubular cutter having a cutting edge arranged in a plane, means for rotating the cutter about an axis, a support for a shoe, means for bodily moving the support with relation to the cutter lengthwise of said axis to cause material to be trimmed simultaneously by slicing cuts from opposite sides of the heel-seat portion of an outsole of the shoe, a stop for limiting movement of the support lengthwise of said axis, a fixed rack having teeth the pitch line of which is arranged approximately in the plane of the cutting edge of the cutter when the support is at the limit of its movement determined by the stop, a pinion secured to the support, and means for rotating the pinion along said rack in two directions to cause a portion of the support to move in cycloidal paths which form a cusp lying approximately in said plane to form continuations of said slicing cuts.

22. A heel seat fitting machine having, in combination, a support for a shoe, a cutter having a blade curved about an axis extending generally lengthwise of the shoe, matrix plates which are curved generally about said axis and which are spaced to form an opening and are constructed and arranged to support the heel-seat portion of an outsole of the shoe, a presser member for forcing the heel-seat portion of said outsole upon the support against the matrix plates to flex said heel-seat portion to a shape determined by said plates, and means for effecting relative translatory movement between the cutter on the one hand and the support and the matrix plates on the other hand to trim a horseshoe-shaped piece of surplus material from the periphery of the heel-seat portion of the outsole.

23. In a heel seat fitting machine, a support for a shoe having an attached outsole, a cutter having a blade curved about an axis extending generally lengthwise of said shoe and having an axially facing correspondingly curved cutting edge, means for rotating the cutter about said axis, a matrix associated with the support, a presser member constructed and arranged to force a heel-seat portion of the outsole of the shoe against the matrix, and means for effecting relative translatory movement between the cutter and the presser member on the one hand and the support and the matrix on the other hand to present to the cutter the heel-seat portion of the outsole flexed progressively to a predetermined shape between the presser member and the matrix to reduce the heel-seat portion of the outsole.

24. A heel seat fitting machine having, in combination, a support for a shoe having an attached outsole, a knife having a cutting blade curved about an axis extending generally lengthwise of the shoe, matrix plates which are curved generally about said axis and are spaced to form an opening, a presser member for forcing a heel-seat portion of the outsole of the shoe mounted upon the support against the matrix plates to flex the heel-seat portion of the outsole to a shape determined by said plates, means for effecting relative translatory movement of the knife and the presser member on the one hand and the support and the matrix plates on the other hand to slice a horseshoe-shaped chip of surplus material from the periphery of the heel-seat portion of the outsole, and a cutter movable transversely of said outsole along the cutting edge of the knife to form heel breast receiving shoulders upon and to remove the horseshoe-shaped chip from said outsole.

25. A heel seat fitting machine having, in combination, a support for a shoe, a knife having a cutting edge curved about an axis extending generally lengthwise of the shoe upon the support, a matrix which is curved about said axis and has an opening, a presser member for forcing the heel-seat portion of an outsole of the shoe upon the support against the matrix to flex the heel-seat portion of said outsole to a shape determined by said matrix, means for effecting relative translatory movement of the knife and the presser member on the one hand and the support and the matrix on the other hand to slice a horseshoe-shaped chip of surplus material from the periphery of the heel-seat portion of the outsole, a cutter movable transversely of the outsole along the cutting edge of the knife, and means for swinging the support together with the shoe mounted on it as the cutter is moved transversely of said outsole to form on the outsole heel breast receiving shoulders and to remove said horseshoe-shaped chip from the outsole.

26. In a heel seat fitting machine, a cutter, a support for a shoe, said support being movable in a rectilinear path, a stop for limiting movement of the support in one direction in said path, a matrix constructed and arranged to be engaged by the heel-seat portion of an outsole of the shoe mounted upon the support, a back gage constructed and arranged to position the shoe lengthwise upon the support, means for adjusting the back gage lengthwise of the shoe upon the support with relation to the matrix, means for constantly forcing the heel-seat portion of the outsole against said matrix, and means for moving said support together with the shoe mounted on it relatively to the cutter in said direction in said rectilinear path to cause the heel-seat portion of the outsole forced against the matrix to be reduced.

27. In a heel seat fitting machine, a cutter having a curved cutting edge, means for moving the cutter lengthwise of its cutting edge, a support for a shoe, said support being movable with relation to the cutter in a rectilinear path, a fixed stop for limiting movement of the support in one direction in said path, a matrix which is associated with the support and is movable in said path and is constructed and arranged to support the heel-seat portion of an outsole of the shoe mounted upon the support, a back gage constructed and arranged to position the shoe lengthwise upon the support, means for moving the back gage relatively to the matrix into different adjusted positions lengthwise of a shoe mounted upon the support, means for forcing the heel-seat portion of the outsole against the matrix, means for moving in said path relatively to the cutter the support and the matrix together with the shoe mounted on them while forcing the heel-seat portion of the outsole against the matrix to reduce said heel-seat portion, and a power-rotated cutter movable bodily transversely of the outsole of the shoe along the cutting edge of the heel seat reducing cutter to form heel breast receiving shoulders upon the outsole and to remove from the outsole a chip trimmed from the outsole by the heel seat reducing cutter.

28. In a heel seat fitting machine, a cutter having a curved cutting edge, means for moving the cutter lengthwise of its cutting edge, a support for a shoe, said support being movable in a rectilinear path with relation to said cutter, a fixed stop for limiting movement of the support in one direction in said path, a matrix which is constructed and arranged to support the heel-seat portion of an outsole of a shoe mounted upon the support, a back gage constructed and arranged to position the shoe lengthwise upon the support, means for moving the back gage into different adjusted positions lengthwise of the support with relation to the matrix, and means for moving said support together with the shoe mounted on it in said path relatively to the cutter while forcing said outsole against the matrix to reduce the heel-seat portion of the outsole.

29. In a heel seat fitting machine, a tubular cutter having a circular cutting edge, means for rotating the cutter, a support for a shoe, said support being movable with relation to the cutter in a rectilinear path to reduce the heel-seat portion of an attached outsole of the shoe, a fixed stop for limiting movement of the support in one direction in said path, a matrix which is movable together with the support in said path and is constructed and arranged to be engaged by the heel-seat portion of said outsole, a back gage mounted on the support and constructed and arranged to position the shoe lengthwise upon said support, means for adjusting the back gage on the support initially to arrange the shoe in different lengthwise positions upon the support, a presser member for forcing the heel-seat portion of the outsole against the matrix as the support and the matrix are moved in said one direction toward the cutter, and a shoulder forming cutter movable transversely of the outsole of the shoe in approximate engagement with the cutting edge of the tubular cutter to remove from the outsole material trimmed from said outsole by the tubular cutter and to form heel breast receiving shoulders upon said outsole.

30. In a heel seat fitting machine, a tubular cutter having a cutting edge, means for rotating the cutter, a support for a shoe having an attached outsole, said support being mounted for movement in a rectilinear path with relation to said cutter, a fixed stop for limiting movement of the support in one direction in said path, a matrix which is associated with said support and is constructed and arranged to support the heel-seat portion of said outsole of the shoe mounted upon the support, a back gage mounted upon the support and constructed and arranged to position the shoe lengthwise upon the support, means for moving the back gage into different adjusted positions lengthwise of the shoe upon the support with relation to the matrix, a presser member for forcing the heel-seat portion of the outsole against the matrix, means for moving the support and the matrix together with the shoe mounted on them relatively to the cutter in said path while said presser member forces the outsole against the matrix to reduce the heel-seat portion of the outsole, a power-rotated shoulder forming cutter movable transversely of the outsole of the shoe along the cutting edge of the heel seat reducing cutter, and means movable in response to movement of and in timed relation with the shoulder forming cutter for swinging the support and accordingly the shoe as the shoulder forming cutter moves transversely of the outsole.

31. A heel seat fitting machine having, in combination, a tubular cutter which is rotatable about an axis and has a cutting edge arranged in a plane, means for rotating said cutter about said axis, a support for a shoe, means for moving the support lengthwise of a shoe mounted thereon and at approximately right angles to the plane of the cutting edge of the cutter and for thereafter swinging the support with relation to the cutter to reduce the heel-seat portion of an outsole of the shoe, and a shoulder forming cutter movable transversely of the outsole approximately in the plane of the cutting edge of the tubular cutter in response to and in timed relation with the swinging movement of the support to remove from the outsole material trimmed from said outsole by the tubular cutter and to form upon said outsole heel breast receiving shoulders.

32. A heel seat fitting machine having, in combination, a cutter having a cutting edge, means for moving the cutter lengthwise of its cutting edge, a support for a shoe, matrices forming an opening and constructed and arranged to be engaged by the heel-seat portion of an outsole of the shoe mounted upon the support, means for adjusting the matrices toward and away from each other to vary the size of said opening, a presser member, and means for moving the support together with the matrices relatively to the cutter to cause surplus material to be trimmed from the margin of the heel-seat portion of the outsole forced against the matrices by the presser member.

33. A heel seat fitting machine having, in combination, a cutter, a support for a shoe, matrices forming an opening and constructed and arranged to be engaged by the heel-seat portion of an attached outsole of a shoe mounted upon the support, a back gage mounted upon the support and constructed and arranged to be engaged by the rear end of the shoe to position the shoe lengthwise upon the support, means for setting the back gage in different adjusted positions upon the support, means for adjusting the matrices toward and away from each other to vary the size of said opening, a presser member, and means for moving the support and the matrices relatively to the cutter to cause a horseshoe-shaped piece of surplus material to be trimmed from the margin of the heel-seat portion of the outsole forced against the matrices by the presser member.

34. A heel seat fitting machine having, in combination, a tubular cutter rotatable about an axis and having a circular cutting edge centered about said axis, a support for a shoe, a pair of matrix plates having cylindrical faces which are curved approximately about said axis and which are spaced to form an opening and are constructed and arranged to be engaged by the heel-seat portion of an outsole of the shoe mounted upon the support, means for adjusting the plates toward and away from each other to vary the size of said opening, a presser member, and means for moving the support together with the matrix plates relatively to the cutter and generally lengthwise of said axis to cause the cutter, against which the heel-seat portion of the outsole pressed against the matrix plates and into said opening by the presser member is forced, to trim surplus material from the margin of the heel-seat portion of the outsole.

35. A heel seat fitting machine having, in combination, a tubular cutter which is rotatable about an axis and has a circular cutting edge centered about said axis, a support for a shoe, a pair of matrix plates having cylindrical faces which are centered about said axis and have a slightly sharper curvature than the cutting edge of the cutter, said matrix plates being spaced to form an opening, a back gage which is mounted upon the support and is constructed and arranged to be engaged by the rear end of the shoe, means for setting the back gage in different adjusted positions upon the support, means for setting the matrix plates in different adjusted operative positions toward and away from each other about said axis to vary the size of said opening, a presser member, means for moving the support together with the matrix plates relatively to the cutter and generally lengthwise of said axis to cause the cutter, against which the heel-seat portion of the outsole pressed against the matrix plates and into the opening by the presser member is forced, to trim surplus material from the margin of the heel-seat portion of the outsole.

36. In a heel seat fitting machine, a cutter having a curved cutting edge rotatable about an axis, means for rotating the cutter about said axis, a matrix having a work supporting face which is curved about said axis and in which is formed an opening, mechanism for forcing the heel-seat portion of the outsole of a shoe against said face of the matrix and into said opening, and means for effecting relative movement of translation lengthwise of said axis between the cutter and the matrix, against which said outsole is forced by said mechanism, to cause material to be trimmed from the margin of the heel-seat portion of said outsole.

37. In a heel seat fitting machine, a cutter having a cutting edge which is curved about an axis, means for rotating the cutter about said axis, matrix plates having work engaging faces which are curved about said axis and are spaced to form an opening, means for setting the matrix plates in different operative positions about said axis to vary the size of said opening, mechanism for forcing the heel-seat portion of an attached outsole of a shoe against said faces of the matrix plates and into said opening, means for effecting relative movement of translation lengthwise of said axis between the cutter and the matrix plates, against which said outsole is forced by said mechanism, to cause material to be trimmed from the margin of the heel-seat portion of the outsole, and manually operative means for moving the matrix plates toward and away from their operative positions to facilitate presenting the shoe to and removing the shoe from the machine.

38. In a heel seat fitting machine, a tubular cutter having a circular cutting edge rotatable about an axis, a matrix having a cylindrical work supporting face which is curved about said axis and has an opening, a presser member comprising a plurality of spring-pressed plungers which are constructed and arranged to force the heel-seat portion of an outsole of a shoe against said face of the matrix and into said opening, and means for effecting relative movement of translation between the matrix on the one hand and the presser member and the tubular cutter on the other hand to cause material to be trimmed from the heel-seat portion of the outsole.

39. In a heel seat fitting machine, a tubular cutter rotatable about an axis, matrix plates having cylindrical work supporting faces which are curved about said axis and are spaced to form an opening, means for moving the matrix plates into different adjusted operative positions about said axis and for securing them in said positions to vary the size of said opening, a presser member comprising a plurality of spring-pressed plungers constructed and arranged to force the heel-seat portion of an attached outsole of a shoe against said faces of the matrix plates and into said opening, and means for effecting relative movement of translation between the matrix plates on the one hand and the presser member and the tubular cutter on the other hand to reduce the heel-seat portion of said outsole.

40. In a heel seat fitting machine, a tubular cutter rotatable about an axis, matrix plates having cylindrical work supporting faces which are curved about said axis and are spaced to form an opening, said matrix plates being adjustable toward and away from each other about said axis to vary the width of said opening, means for securing the matrix plates in their adjusted positions, a presser member constructed and arranged to force the heel-seat portion of the outsole of a shoe against the faces of the matrix plates and into said opening, means for moving said presser member to and from an operative position in which it is in forced engagement with the outsole and means for effecting relative movement of translation between the matrix plates on the one hand and the presser member and the tubular cutter on the other hand to reduce the heel-seat portion of the outsole.

41. In a heel seat fitting machine, a tubular cutter having a cutting edge rotatable about an axis, a matrix having a work supporting face which is curved about said axis and has an opening, a presser member constructed and arranged to force the heel-seat portion of an attached outsole of a shoe against said face of the matrix and into said opening, means for effecting relative movement of translation between the matrix on the one hand and the presser member and the tubular cutter on the other hand to slice a horseshoe-shaped piece of material from the heel-seat portion of the outsole, and a second cutter movable transversely of said outsole along the cutting edge of the tubular cutter to form heel breast receiving shoulders upon the outsole and to detach from the outsole the horseshoe-shaped piece of material trimmed from the outsole by the tubular cutter.

42. In a heel seat fitting machine, a heel-seat reducing cutter, a support for a shoe, means for effecting relative movement of translation between the cutter and the support to trim material from the heel-seat portion of an outsole of the shoe, a cutter for forming heel breast receiving shoulders on the outsole and for detaching from the outsole material trimmed from said outsole by the heel-seat reducing cutter, means for retaining the shoulder forming cutter in an inoperative position a substantial distance away from the heel-seat reducing cutter when the machine is idle, and means responsive to movement of translation between the support and the heel-seat reducing cutter for moving the shoulder forming cutter into an operative position adjacent to the outsole and to the heel-seat reducing cutter.

43. In a heel seat fitting machine, a support for a shoe, a matrix for supporting the heel-seat portion of an attached outsole of the shoe mounted upon the support, a tubular cutter having a cutting edge, means for rotating said cutter, a presser member for forcing the heel-seat portion of the outsole against the matrix, means for effecting relative movement of translation between the support and the matrix on the one hand and the tubular cutter and the presser member on the other hand to cause a horseshoe-shaped chip of surplus material to be removed from the heel-seat portion of the outsole, a shoulder forming cutter, mechanism for moving said shoulder forming cutter transversely of said outsole and along the cutting edge of the tubular cutter to form heel breast receiving shoulders on the outsole and to detach the horseshoe-shaped chip from said outsole, means for retaining the shoulder forming cutter in an inoperative position a substantial distance away from the tubular cutter when the machine is idle, and means responsive to movement of translation between the support and the tubular cutter for moving the shoulder forming cutter to an operative position adjacent to the cutting edge of the tubular cutter.

44. In a heel seat fitting machine, a support for one or more chips trimmed from the lateral margins of an outsole of a shoe, said support having an edge, a cutter, means for swinging the cutter bodily about an axis into an operative position adjacent to said edge of the support, and means for bodily swinging the cutter about another axis to move the cutter transversely of the outsole along said edge of the support to form heel breast receiving shoulders on the outsole and to remove said one or more chips from the outsole.

JOHN W. ASHLEY.

REFERENCES CITED

The following references are of record in the file of this patent:

UNITED STATES PATENTS

| Number | Name | Date |
|---|---|---|
| 1,307,285 | Wentworth et al. | June 17, 1919 |